United States Patent
Helmy et al.

(10) Patent No.: US 9,162,403 B2
(45) Date of Patent: Oct. 20, 2015

(54) APPARATUS FOR MANUFACTURING AND PROCESSING PRE-STRETCH FILMS HAVING STRIPS OF INCREASED THICKNESS

(71) Applicant: Davis-Standard, LLC, Pawcatuck, CT (US)

(72) Inventors: Hassan Helmy, Branchburg, NJ (US); Robert F. Moeller, Baldwinsville, NY (US); John P. Christiano, Old Lyme, CT (US)

(73) Assignee: Davis-Standard, LLC, Pawcatuck, CT (US)

( * ) Notice: Subject to any disclaimer, the term of this patent is extended or adjusted under 35 U.S.C. 154(b) by 0 days.

(21) Appl. No.: 14/212,840

(22) Filed: Mar. 14, 2014

(65) Prior Publication Data

US 2014/0272306 A1    Sep. 18, 2014

Related U.S. Application Data

(63) Continuation-in-part of application No. 14/212,289, filed on Mar. 14, 2014, and a continuation-in-part of application No. 14/210,531, filed on Mar. 14, 2014.

(60) Provisional application No. 61/932,519, filed on Jan. 28, 2014, provisional application No. 61/788,776, filed on Mar. 15, 2013.

(51) Int. Cl.
*B29D 7/01* (2006.01)
*B29C 55/06* (2006.01)
*B29C 47/00* (2006.01)
(Continued)

(52) U.S. Cl.
CPC .............. *B29D 7/01* (2013.01); *B29C 47/0021* (2013.01); *B29C 47/0057* (2013.01); *B29C 47/16* (2013.01); *B29C 47/8845* (2013.01); *B29C 47/8875* (2013.01); *B29C 47/92* (2013.01); *B29C 55/06* (2013.01); *B29C 47/003* (2013.01); *B29C 47/065* (2013.01); *B29C 55/02* (2013.01); *B29C 2793/0063* (2013.01); *B29C 2947/92647* (2013.01); *Y10T 428/24479* (2015.01)

(58) Field of Classification Search
None
See application file for complete search history.

(56) References Cited

U.S. PATENT DOCUMENTS

| 1,843,087 | A |   | 1/1932 | Luitwieler |
| 2,547,763 | A | * | 4/1951 | Land et al. ................. 264/288.4 |

(Continued)

FOREIGN PATENT DOCUMENTS

| CA | 2068908 C | 6/2000 |
| CA | 2319302 A1 | 4/2001 |

(Continued)

OTHER PUBLICATIONS

International Search Report issued in corresponding PCT Application No. PCT/US2014/026979, dated Jul. 7, 2014.

(Continued)

*Primary Examiner* — Jeffrey Wollschlager
(74) *Attorney, Agent, or Firm* — MKG, LLC

(57) ABSTRACT

A method for maximizing a width of a pre-stretch film includes providing polymer being suitable for producing the pre-stretch film. A pre-stretch film having strips of increased thickness is produced. The method includes coordinating a thickness of the strips of increased thickness with a formation of edge thickening caused by neck-in during stretching of the pre-stretch film.

2 Claims, 21 Drawing Sheets

(51) Int. Cl.
| | |
|---|---|
| B29C 47/16 | (2006.01) |
| B29C 47/88 | (2006.01) |
| B29C 47/92 | (2006.01) |
| B29C 47/06 | (2006.01) |
| B29C 55/02 | (2006.01) |

(56) References Cited

U.S. PATENT DOCUMENTS

| | | | |
|---|---|---|---|
| 2,718,666 A * | 9/1955 | Knox | 264/177.17 |
| 2,897,729 A | 8/1959 | Aston et al. | |
| 3,399,096 A * | 8/1968 | Ranger | 156/202 |
| 3,697,205 A | 10/1972 | Ross et al. | |
| 3,748,822 A | 7/1973 | Borgardt | |
| 3,753,824 A | 8/1973 | Bosse | |
| 3,762,250 A | 10/1973 | Huskey | |
| 3,773,002 A | 11/1973 | Burton | |
| 3,799,536 A | 3/1974 | Gregoire | |
| 3,906,073 A * | 9/1975 | Kim et al. | 264/147 |
| 3,978,191 A | 8/1976 | Allen et al. | |
| 3,980,289 A | 9/1976 | Harm | |
| 4,154,180 A | 5/1979 | Burton | |
| 4,315,963 A | 2/1982 | Havens | |
| 4,340,212 A | 7/1982 | Simson | |
| 4,420,148 A | 12/1983 | Meadows | |
| 4,526,567 A | 7/1985 | Yokoe | |
| 4,588,463 A | 5/1986 | Barber et al. | |
| 4,621,777 A | 11/1986 | O'Connor | |
| 4,676,851 A | 6/1987 | Scheibner et al. | |
| 4,732,727 A | 3/1988 | Havens | |
| 4,872,590 A | 10/1989 | Sasaki et al. | |
| 4,887,973 A | 12/1989 | Susini et al. | |
| 4,905,451 A | 3/1990 | Jaconelli et al. | |
| 4,932,932 A | 6/1990 | Schmidt et al. | |
| 5,013,595 A | 5/1991 | Parry | |
| 5,168,685 A * | 12/1992 | Suzuki | 53/141 |
| 5,280,900 A | 1/1994 | Hannon | |
| 5,307,609 A * | 5/1994 | Kurata et al. | 53/556 |
| 5,458,841 A * | 10/1995 | Shirrell | 264/230 |
| 5,531,393 A * | 7/1996 | Salzsauler et al. | 242/160.4 |
| 5,565,222 A | 10/1996 | Sherer | |
| 5,707,660 A | 1/1998 | Van Erden et al. | |
| 5,884,857 A * | 3/1999 | Martin-Cocher et al. | 242/160.4 |
| 6,375,781 B1 * | 4/2002 | Wojcik et al. | 156/229 |
| 6,592,699 B1 * | 7/2003 | Mehta et al. | 156/227 |
| 6,623,586 B2 | 9/2003 | Mortellite et al. | |
| 6,824,637 B2 | 11/2004 | Mullet et al. | |
| 7,611,087 B2 | 11/2009 | Gatti | |
| 7,641,141 B2 | 1/2010 | Pellengo Gatti | |
| 7,841,276 B2 | 11/2010 | Eckert et al. | |
| 8,119,055 B2 | 2/2012 | Pellengo Gatti | |
| 8,286,904 B2 | 10/2012 | Pellengo Gatti | |
| 8,292,212 B2 | 10/2012 | Pellengo Gatti | |
| 8,453,696 B2 | 6/2013 | Boggs | |
| 2002/0074677 A1 | 6/2002 | Przytulla et al. | |
| 2002/0174942 A1 | 11/2002 | Mullet et al. | |
| 2002/0182367 A1 | 12/2002 | Salzsauler et al. | |
| 2003/0189118 A1 | 10/2003 | Smith | |
| 2005/0269733 A1 | 12/2005 | Pawloski | |
| 2008/0020186 A1 * | 1/2008 | Hebrink et al. | 428/167 |
| 2010/0012764 A1 | 1/2010 | Pirtle et al. | |
| 2010/0015393 A1 | 1/2010 | Pirtle et al. | |
| 2010/0021738 A1 * | 1/2010 | Maida et al. | 428/411.1 |
| 2011/0219601 A1 | 9/2011 | Henry et al. | |
| 2013/0202853 A1 * | 8/2013 | Bergman et al. | 428/167 |
| 2013/0244854 A1 | 9/2013 | Pirtle et al. | |
| 2014/0021644 A1 * | 1/2014 | Baab et al. | 264/40.1 |
| 2014/0057088 A1 | 2/2014 | Pirtle | |

FOREIGN PATENT DOCUMENTS

| | | |
|---|---|---|
| CA | 2334401 A1 | 9/2001 |
| CN | 1083790 C | 5/2002 |
| CN | 101954734 A | 1/2011 |
| CN | 202107116 U | 1/2012 |
| CN | 102582124 A | 7/2012 |
| CN | 202559065 U | 11/2012 |
| DE | 2139205 A1 | 3/1972 |
| DE | 2426891 A1 | 1/1976 |
| DE | 3604703 A1 | 9/1987 |
| DE | 69408229 T2 | 6/1998 |
| DK | 2024165 T3 | 7/2010 |
| EP | 0327100 A2 | 9/1989 |
| EP | 329814 B1 | 1/1992 |
| EP | 2024165 B1 | 4/2010 |
| ES | 2344581 T3 | 8/2010 |
| FR | 2676194 A1 | 11/1992 |
| GB | 998126 | 7/1965 |
| GB | 1110723 | 4/1968 |
| GB | 1170640 | 11/1969 |
| GB | 1277519 | 6/1972 |
| GB | 1279442 | 6/1972 |
| GB | 1328255 | 8/1973 |
| JP | 59103730 A | 6/1984 |
| JP | 61209135 | 9/1986 |
| JP | 11139682 A | 5/1995 |
| JP | 2001214138 A | 8/2001 |
| JP | 2004099190 A | 4/2004 |
| JP | 2005089126 A | 4/2005 |
| JP | 2005524592 T | 8/2005 |
| JP | 2009082155 A | 4/2009 |
| JP | 2013208296 A | 10/2013 |
| KR | 1019990044117 A | 6/1999 |
| KR | 1020050075752 A | 7/2005 |
| SE | 533710 C2 | 12/2010 |
| TW | M248734 U | 11/2004 |
| WO | 9849062 A1 | 11/1998 |
| WO | 99/61219 A1 | 12/1999 |
| WO | 2005123555 A1 | 12/2005 |
| WO | 2006012933 A1 | 2/2006 |
| WO | 2007131684 A1 | 11/2007 |
| WO | 2009000510 A1 | 12/2008 |
| WO | 2010133495 A1 | 5/2010 |
| WO | 2010149479 A1 | 12/2010 |
| WO | 2012001185 A1 | 1/2012 |
| WO | 2012055008 A1 | 5/2012 |
| WO | 2012126977 A1 | 9/2012 |

OTHER PUBLICATIONS

International Search Report issued in corresponding PCT Application No. PCT/US2014/028675, dated Jul. 7, 2014.
International Search Report issued in PCT/US2014/028513, dated Aug. 11, 2014.
D. Auhl et al., "Film Casting", http://www.irc.leeds.ac.uk, document dated Oct. 27, 2010.
D. Auhl et al., Document No. XP-002726626, retrieved from the Internet: https://web.archive.org/web/20101027202931/http://www.irc.leeds.as.uk/mupp2.newscience.html, retrieved on Oct. 27, 2010.
International Search Report and Written Opinion for PCT/US2014/028115, dated Jan. 9, 2015.
International Preliminary Report on Patentability for International Application No. PCT/US2014/028675, dated Feb. 20, 2015.

* cited by examiner

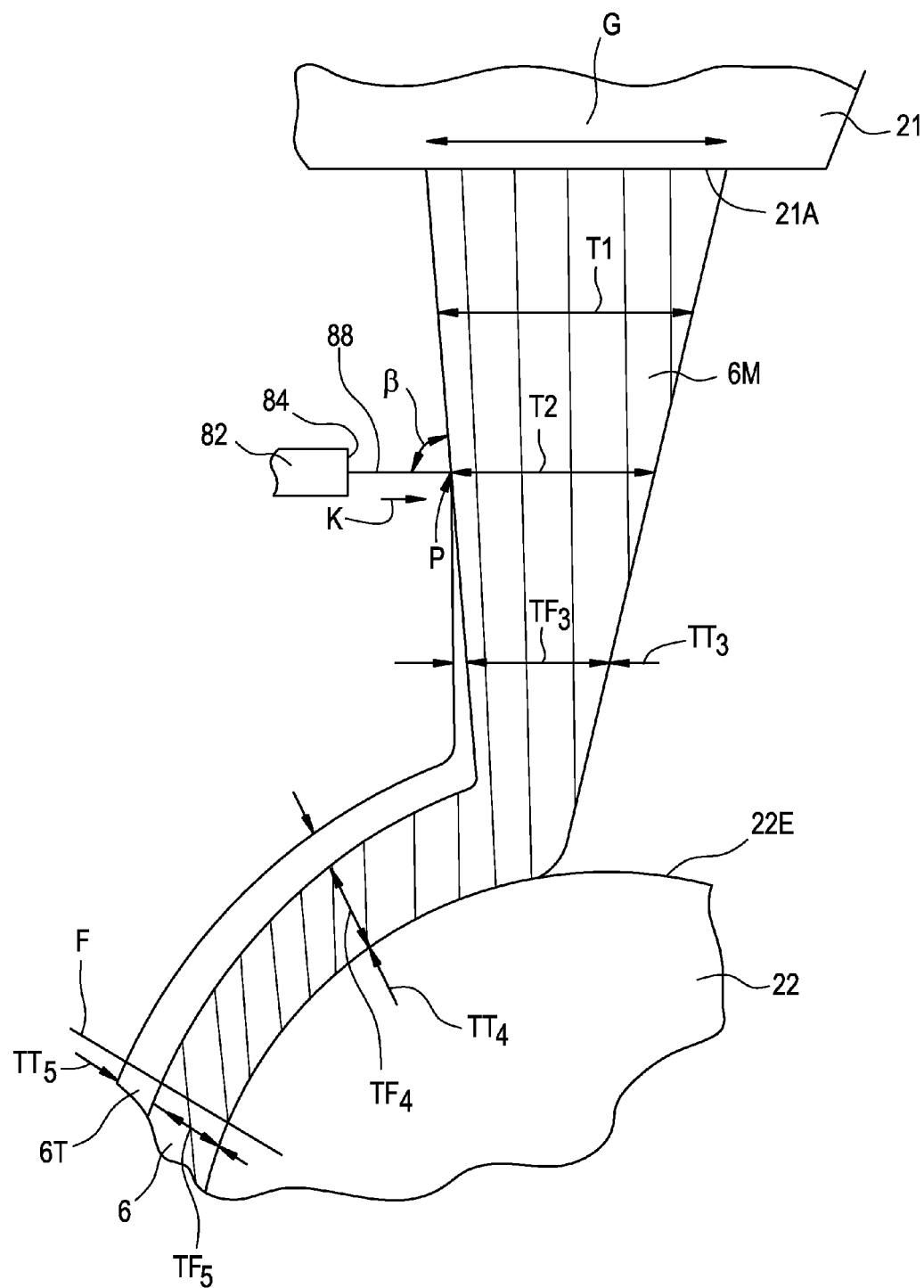

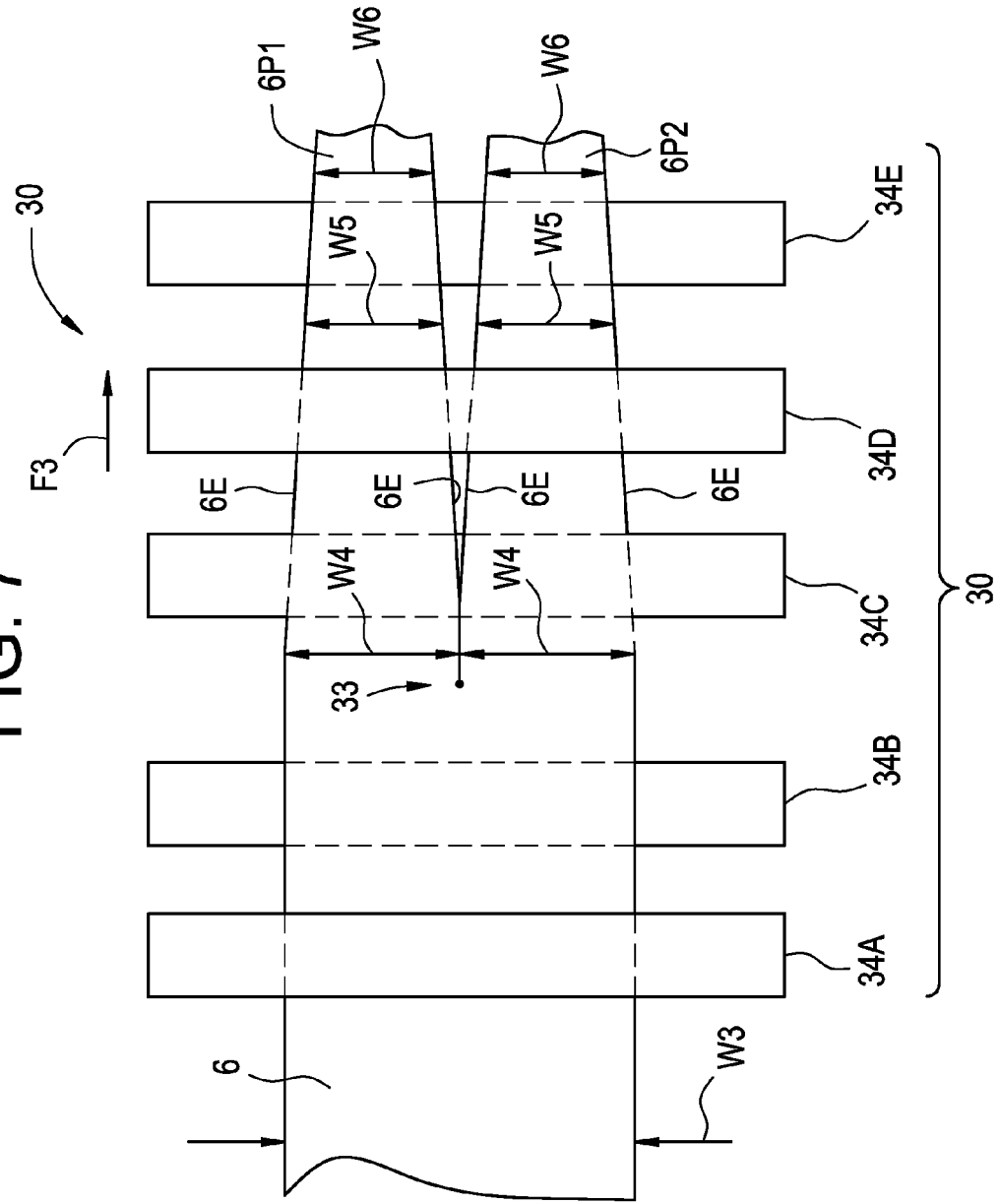

APPARATUS FOR MANUFACTURING AND PROCESSING PRE-STRETCH FILMS HAVING STRIPS OF INCREASED THICKNESS

CROSS REFERENCE TO RELATED APPLICATIONS

This application is a continuation-in-part of U.S. patent application Ser. No. 14/210,531, entitled "Apparatus for Manufacturing and Processing Films," and filed Mar. 14, 2014, the subject matter of which is incorporated herein by reference in its entirety. This application is a continuation-in-part of U.S. patent application Ser. No. 14/212,289, entitled "Apparatus for Manufacturing and Processing Pre-Stretch Films Having Strips of Increased Thickness," and filed Mar. 14, 2014, the subject matter of which is incorporated herein by reference in its entirety. This application claims priority to U.S. Provisional Patent Application Ser. No. 61/788,776, entitled "Apparatus for Manufacturing and Processing Films," and filed Mar. 15, 2013, the subject matter of which is incorporated herein by reference in its entirety. This application claims priority to U.S. Provisional Patent Application Ser. No. 61/932,519, entitled "Apparatus for Manufacturing and Processing Films Having Strips of Increased Thickness," and filed Jan. 28, 2014, the subject matter of which is incorporated herein by reference in its entirety.

FIELD OF THE INVENTION

The present invention relates to the field of manufacturing pre-stretch films used for both machine film and hand film for packaging applications and in particular to an apparatus for manufacturing and processing pre-stretch films having one, two or more strips of increased thickness. The strips of increased thickness are generated by selectively cooling portions of a molten film material proximate a die outlet by directing a stream of coolant onto the polymer as the polymer exits the die outlet.

The present invention also relates to an apparatus and method of slitting the strips of increased thickness, stretching the film having the strips of increased thickness and controlling neck-in of the film during stretching by setting a distance between the stretching rollers.

BACKGROUND OF THE INVENTION

Films, such as polymer films, can be produced by several different processes including blown film and chill roll casting. In the blown film method, the melt is extruded through an annular die to form a bubble expanded with internal air pressure. The bubble is then sized and air cooled with an air ring, internal bubble cooling and a sizing cage. The bubble is then collapsed in a nip thereby forming a double ply film that can be processed by Machine Direction Orientation (MDO) process. The film is then either slit separated and wound as two individual webs, or wound in double thickness without being separated.

In the casting of polymer films, polymers can be extruded through a die to form a melt curtain which is then rapidly quenched on a chill roll comprising an internally cooled roller or drum. The films can consist of one or more layers and can have a thickness of between 6 and 200 microns (0.24 to 7.9 mil, 1 mil=0.001 inches).

Various types of films can be manufactured from the aforementioned methods. One such film is a conventional stretch film that is used in hand (manual) or machine wrapping applications. The conventional stretch film is manufactured from specific materials (e.g., polyolefin polymers) with such characteristics and behavior that it can impart sufficient stretchability into the film so that the stretch film can be stretched as it is hand or machine wrapped around an object. For example, conventional stretch films can be used in bundling and packaging applications such as for securing bulky loads such as boxes, merchandise, produce, equipment, parts, and other similar items onto pallets.

The performance of the film to secure an object to a pallet (e.g., load retention performance) can be affected by the amount of stretch in the film, the strength of the film, the composition of the polymer, the number of wraps around the object and the strength of the edges of the film. Poor edge strength could result in tearing of the film during the wrapping process, particularly with high speed wrappers and thin films. Stretch films, particularly thin films at 10 micron and under, typically employ folded edges to increase the strength of the edge of the film. The films produced according to this process will be referred to herein as "conventional stretch films."

Another type of film that can be manufactured from the aforementioned processes is a pre-stretch film. After processing, pre-stretch films are stiffer and thinner than conventional stretch film. The pre-stretch film is made by stretching or orientating a film beyond its yield point. However, the film material suitable for manufacturing pre-stretch film typically has a relatively lower viscosity and is a more stretchy (e.g., less stiff) compared to that of the polyolefin material used for conventional stretch films. The method of improving the stiffness properties of the films is referred to as the Machine Direction Orientation (MDO) process. In the MDO process, a film is stretched beyond its yield point (hot or cold) typically up to 300-400 percent, whereby its extendability (e.g. elastic stretchability) is greatly diminished. The film stretched in the MDO becomes stiffer and thinner and exhibits a greater load holding characteristic. Therefore, the pre-stretch film needs to be only minimally stretched (e.g., 20-40 percent, as compared with the conventional stretch film that requires up to 200 to 300 percent) during application to secure a load. During the stretching process in the MDO, the entire film decreases in thickness and decreases in width (i.e., neck-in process). However, due to the neck-in process the reduction in thickness of the film at the two free edges is not as pronounced as compared to remaining portions of the film between the free edges. As a result of the neck-in process that occurs during stretching, the free edges are naturally thicker than the remaining portions of the film. For example, the free edges of the film are typically 30-100 percent thicker than the rest of the film as a result of the neck-in, thereby strengthening the edge and eliminating the need for edge folding.

Cost reduction and environmental demands in recent years have resulted in a trend of thickness reduction for the hand (manual) as well as machine stretch films used in wrapping applications. It is more common to see stretch films under 17 microns down to 8 microns in those applications with thinner films comprising 3 to 35 layers (Nano films) but more typically (5 to 9 layers). Thinner films (12 micron and under) are typically made from lower melt index (higher viscosity) Polyolefin polymers to insure the production of stiffer and stronger stretch films to secure the wrapped product on the pallet. Thin films (e.g., 8-10 microns) are typically less stretchy than the prior art films having a conventional thicknesses of 20-25 micron. One side effect of thickness down gauging of those conventional stretch films, is that the edges of the film become fragile and more prone to damage (e.g., edge tearing) during handling as well as during the wrapping process. Referring to FIG. 1, in order to strengthen the edges 200 of a thin film 206 it is common to fold the edges 200 of the film to create a double thickness 2T of the film at both ends.

Another method to produce thinner stretch films is through producing thicker films (i.e., 17 to 25 micron) through an extrusion process (e.g., using cast or blown techniques) and then stretching the thicker films in an MDO prior to winding the thinner pre-stretch films having a thickness of about 6 to 10 micron. The film composition of those pre-stretch films are typically 3 to 5 layers of polyolefin resins with higher melt flow (e.g., 3-5 melt flow indexas compared with the lower melt flow resins (e.g., 1-3 melt flow index) used in making thin stiffer conventional stretch films as described herein. Melt flow index or MFI is a measure of the ease of flow of the melt of a thermoplastic polymer. It is defined as the mass of polymer, in grams, flowing in ten minutes through a capillary of a specific diameter and length by a pressure applied via prescribed alternative gravimetric weights for alternative prescribed temperatures. The method is described in standards ASTM D1238 and ISO 1133. Higher melt flow resins are typically easier to process than lower melt flow resins used in the manufacture of conventional stretch films and thus allow higher production speeds. As shown in FIG. 2A, a film 306 having a width W30 is fed to the stretching rollers 334A and 334B of the MDO 330. During the stretching process in the MDO 330, the film 306N necks-in and becomes narrower (i.e., width W32) than the width W30 prior to stretching. As the film 306N is stretched, the free edges 306E of the film 306N naturally remain thicker (e.g., a thickness T30E) than remaining portions of the film 306N which have a lesser thickness T30, due to the neck-in phenomenon as shown in FIG. 2B. The thickness of the free edges of the pre-stretch film typically increase to 30-100 percent of thickness of the rest of the film, thereby strengthening the free edge and eliminating the need for edge folding. The films produced according to this process (i.e., stretching via the MDO) will be referred to herein as "pre-stretch films."

SUMMARY

There is disclosed herein a method for maximizing a width of a pre-stretch film includes providing polymer being suitable for producing the pre-stretch film. A pre-stretch film having strips of increased thickness is produced. The method includes coordinating a thickness of the strips of increased thickness with a formation of edge thickening caused by neck-in during stretching of the pre-stretch film.

There is disclosed herein a device for producing pre-stretch film such as such as but not limited to in line manufacturing and off line manufacturing. The device includes a die defining a die outlet through which molten polymer is extruded. The polymer is suitable for producing the pre-stretch film. The device also includes one or more coolant supplies positioned proximate the die outlet for directing a stream of coolant onto the polymer as the polymer exits the die outlet.

There is also disclosed herein a method for producing pre-stretch film-such as but not limited to in line manufacturing and off line manufacturing. The method includes providing an extruder die having a die outlet and a casting drum spaced apart from the die outlet. A polymer suitable for producing the pre-stretch film is provided and heated to a molten condition. The molten polymer is delivered to the die and extruded through the die outlet towards the casting drum. At least two streams of coolant (typically more than two) are directed onto a portion of the polymer at a position between the die outlet and the casting drum. A film is formed in which the portion of the molten polymer film affected by the cooling streams has a thickness that exceeds a base thickness of the film. The film is stretched after the film is separated from the casting drum, wherein the stretching produces the pre-stretch film.

A film suitable for producing a pre-stretch film is formed on the casting drum. Portions of the film have thicknesses that exceed a base thickness of the film. The film is stretched prior to winding to produce the pre-stretch film after the forming of the film on the casting drum. The present invention includes a pre-stretch film having a base thickness and a plurality of strips of increased thickness formed therein. The strips run longitudinally along a length of the film. The strip thickness is greater than the base thickness. The strips are separated from each other by a predetermined distance.

The present invention includes a method for manufacturing of a pre-stretch film, for example, such as but not limited to in line manufacturing and off line manufacturing. The method includes providing a film having several thickened film strips. The film is suitable for producing pre-stretch film. Each thickened film strip is slit to form a first thickened edge and a second thickened edge. The film is thinned and stiffened by stretching between stretching rollers rotated at different speeds and setting a spacing between the stretching rollers. The spacing is set to a magnitude to minimize neck-in between the stretching rollers. In one embodiment, the spacing is about 0 to 20 mm and preferably is less than 10 mm. In one embodiment the spacing is less than 5 mm.

The present invention includes a method for manufacturing of a pre-stretch film. The method includes providing a film with strips of increased thickness. Each thickened film strip is slit to form a first thickened edge and a second thickened edge. The film is thinned out and stiffened by stretching between driven stretching rollers rotated at different speeds and selecting a diameter of the stretching rollers. The diameter is to a magnitude to minimize neck-in between the drive rollers.

There is also disclosed herein a device for producing pre-stretch films. The device includes a die defining a die outlet through which molten polymer is extruded. The polymer is suitable for producing the pre-stretch film. The die includes a deformable die lip. An actuator is in communication with the die lip for selectively deforming portions of the die lip to increase polymer flow through the deformations to produce strips of increased thickness exiting the die lip.

There is also disclosed herein a device for producing pre-stretch film. The device includes a die defining a die outlet through which molten polymer is extruded. The polymer is suitable for producing the pre-stretch film, The die defines at least one die lip. One or more grooves are formed in the die lip(s). The grooves are configured to increase polymer flow through the groove(s) to produce strips of increased thickness exiting the die lip.

There is further disclosed herein a device for producing pre-stretch film, The device includes a die having two or more sources of one or more molten polymers. The sources are configured to output the molten polymer(s) at two or more different flow rates to produce strips of increased thickness exiting the die. The polymer is suitable for producing the pre-stretch film.

BRIEF DESCRIPTION OF THE DRAWINGS

FIG. 6A is an enlarged partial cross sectional view of a portion of the pre-stretch film processing apparatus of FIG. 4A, showing a coolant impinging the film at right angle;

FIG. 7 is schematic top view of a film stretching section of the pre-stretch film processing apparatus of FIG. 3;

DETAILED DESCRIPTION

Figure 3A:
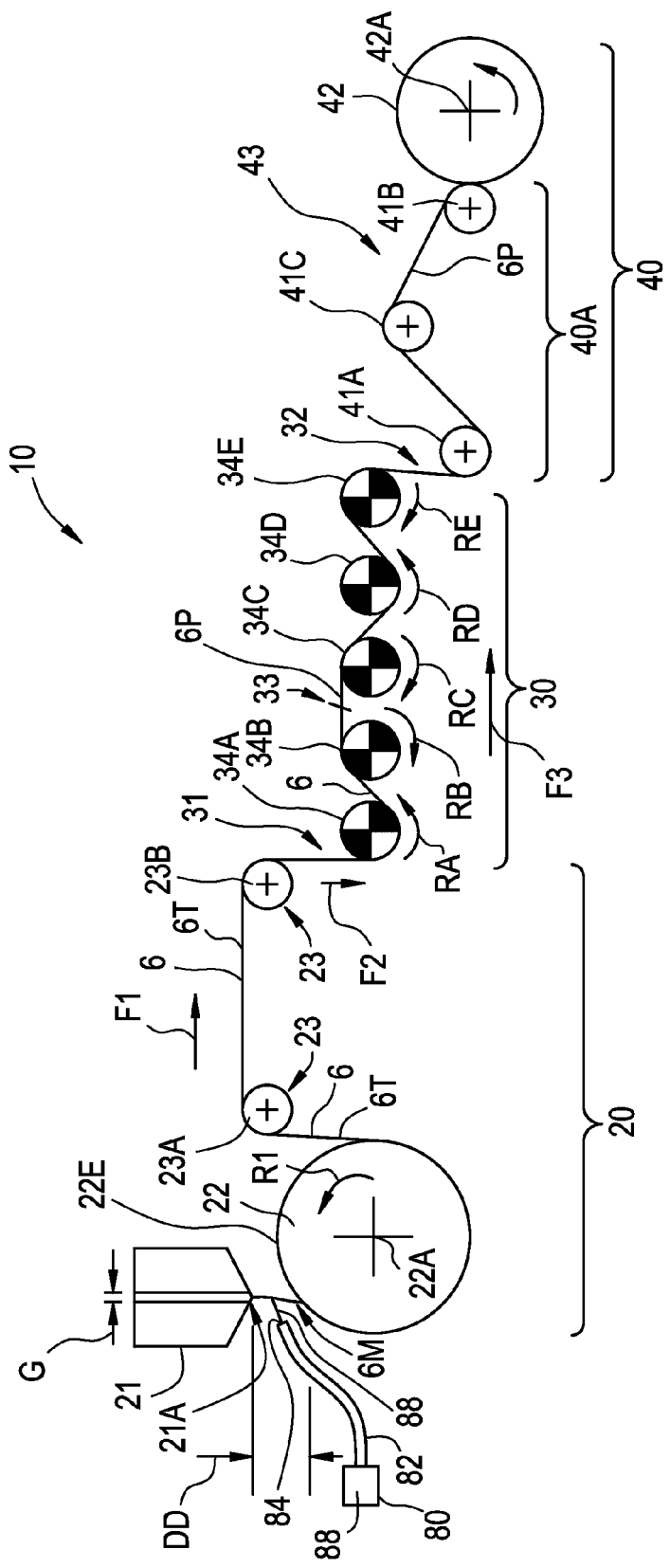
FIG. 3A is a schematic diagram of a pre-stretch film processing apparatus of the present invention, wherein the film is slit in the stretching section.
Figure 3B:
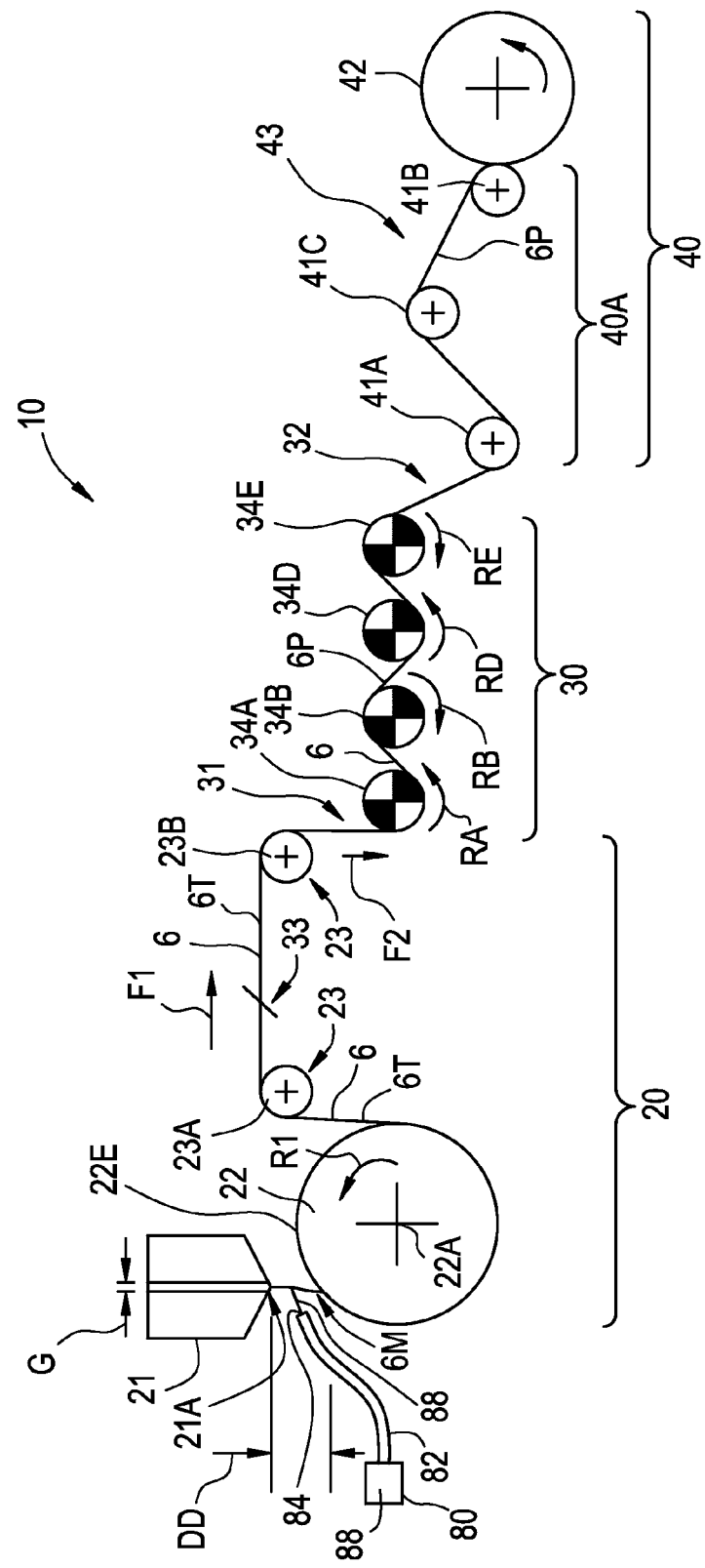
FIG. 3B is a schematic diagram of a pre-stretch film processing apparatus of the present invention, wherein the film is slit before the stretching section.

As shown in FIG. 3A, a device for producing pre-stretch film is generally designated by the numeral 10. The device 10 includes a film delivery section 20 and a film stretching section 30 (e.g., MDO) positioned downstream of the film delivery section 20. The film processing apparatus 10 includes a film receiving section 40 positioned downstream of the film stretching section 30. The film stretching section 30 includes an inlet 31 and an outlet 32. A slitting device 33 is positioned within the film stretching section 30, between the inlet 31 and the outlet 32. However, in one embodiment the slitting device 33 is positioned before the film stretching section 30, as shown in FIG. 3B. As shown in FIG. 3B the slitter 33 is positioned between the idler roller 23A and idler roller 23B. In addition, as shown in FIG. 3B there are four stretching rollers 34A, 34B, 34D and 34E.

Figure 4A:
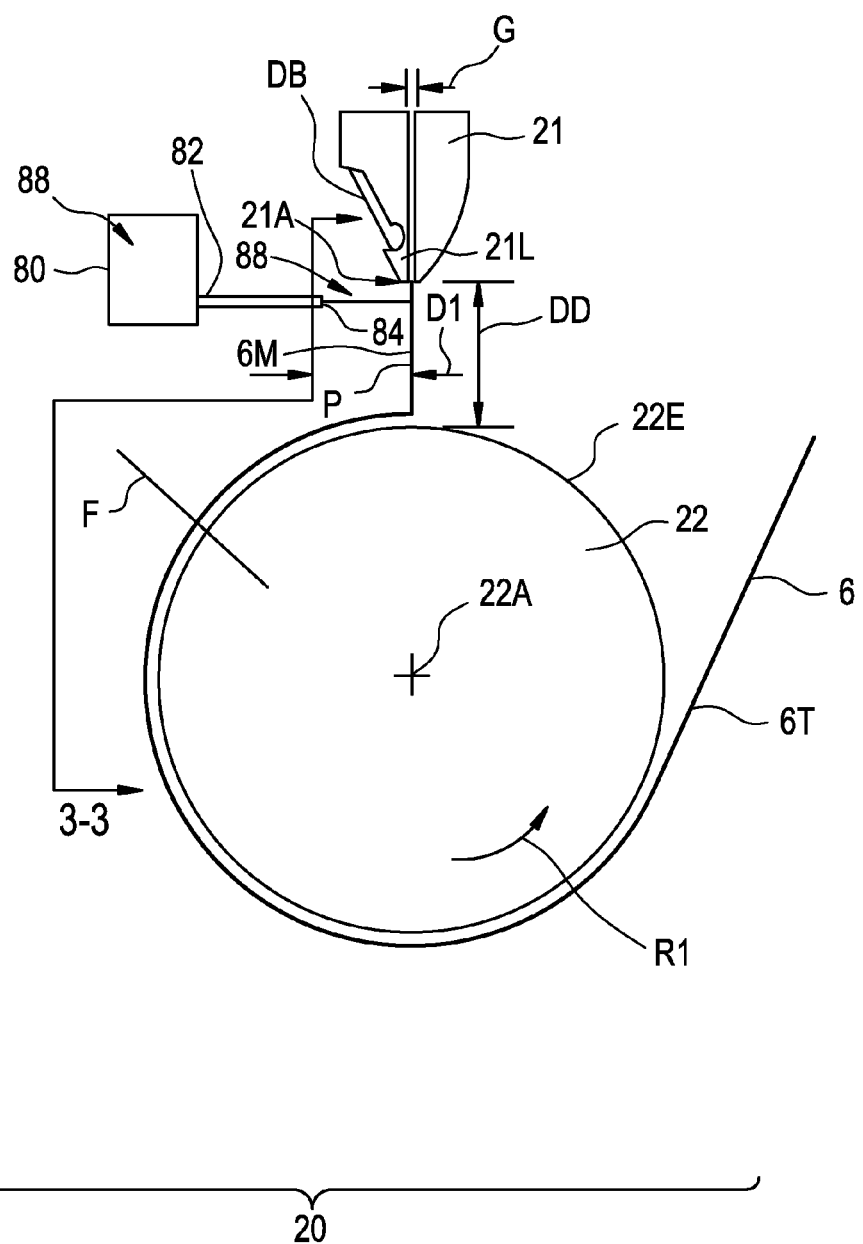
FIG. 4A is a schematic cross sectional view of a die and casting drum of the pre-stretch film processing apparatus of FIG. 3A.

As shown in FIG. 3A, the film delivery section 20 includes a pre-stretch film production device, for example a casting device including a material feeder 21, such as a die which discharges molten material 6M from an outlet 21A thereof onto a casting drum 22. The outlet 21A of the die 21 is spaced apart from the drum 22 by a distance DD, as shown in FIG. 4A. In one embodiment, the distance DD is about 0.25 to 5.0 inches (6 to 130 mm). The die gap G is a generally linear opening in the die of about 1 mm as indicated by the letter G in FIG. 4A. The die gap G is typically adjustable by means of die bolts DB proximate the exit of die to reduce the die opening of 1 mm down to 0.80 to 0.25 mm for the purpose of producing different film thickness out of the die gap. Reducing the die gap reduces the thickness of the film. In one embodiment, the material is a polymer having a suitable melt flow, viscosity and composition for making pre-stretch film.

Referring to FIG. 3A, the film delivery section 20 includes the rotatable drum 22 which defines an exterior surface 22E and which is configured to rotate about an axis 22A, for example, in the direction indicated by the arrow R1. The molten material 6M is transferred to the exterior surface 22E of the drum 22 via the outlet 21A while the drum is rotating. The drum 22 is maintained at a constant temperature for cooling and solidifying the molten material 6M to produce a thin film 6 thereon. Such constant cooling temperature of the cooling drum can be increased or decreased by means of the temperature control system of the cooling drum to suit the process of the stretch film manufacturing. In one embodiment, the drum is a heat sink which cools and solidifies the molten material 6M. The film 6 is stretchable below its yield point, however it is permanently deformed and stretched at or above its yield point.

Figure 4B:
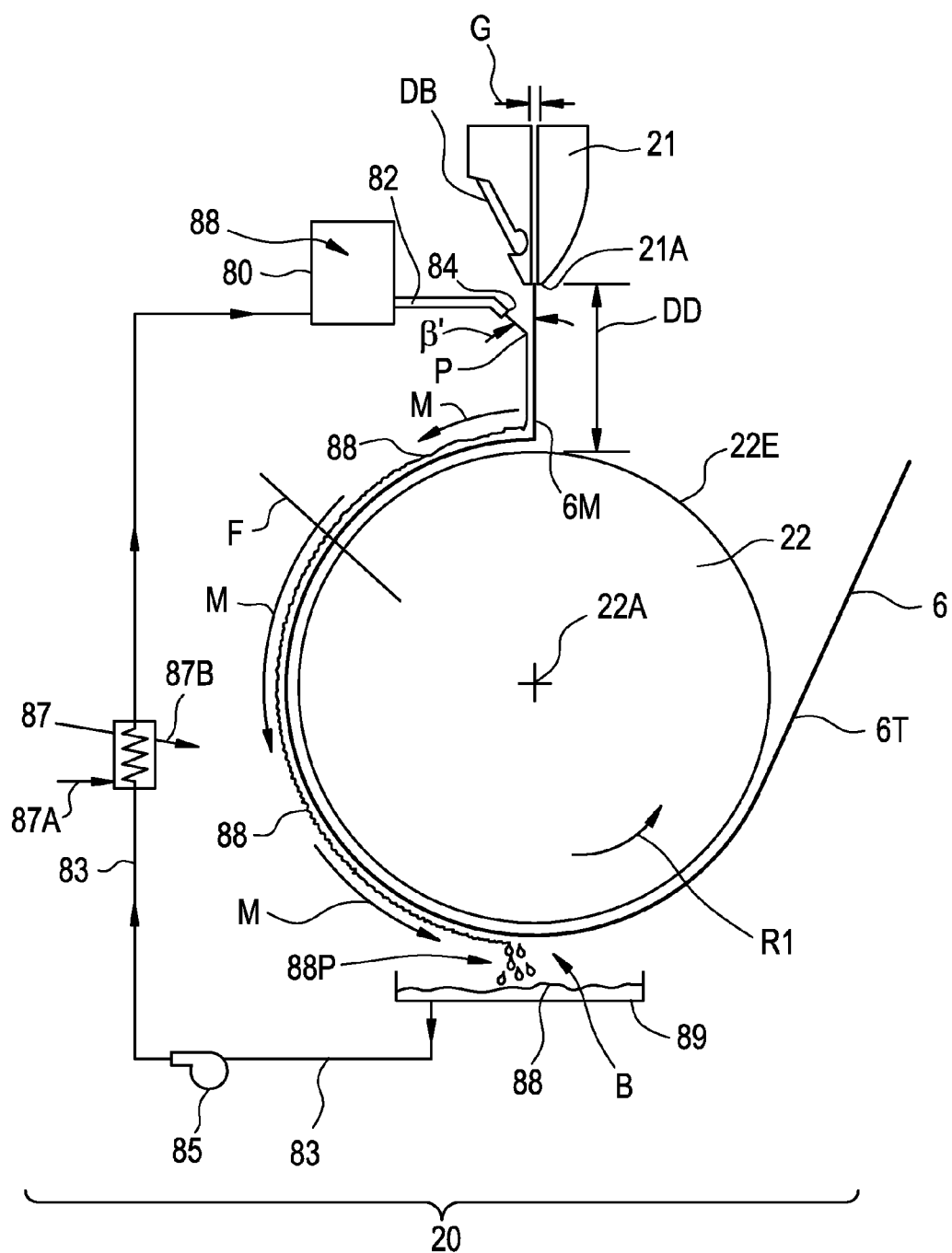
FIG. 4B is another embodiment of the die and casting drum of the pre-stretch film processing apparatus of FIG. 3A, showing the coolant applied to the molten film at a different angle and also including a coolant recirculation system.
Figure 5A:
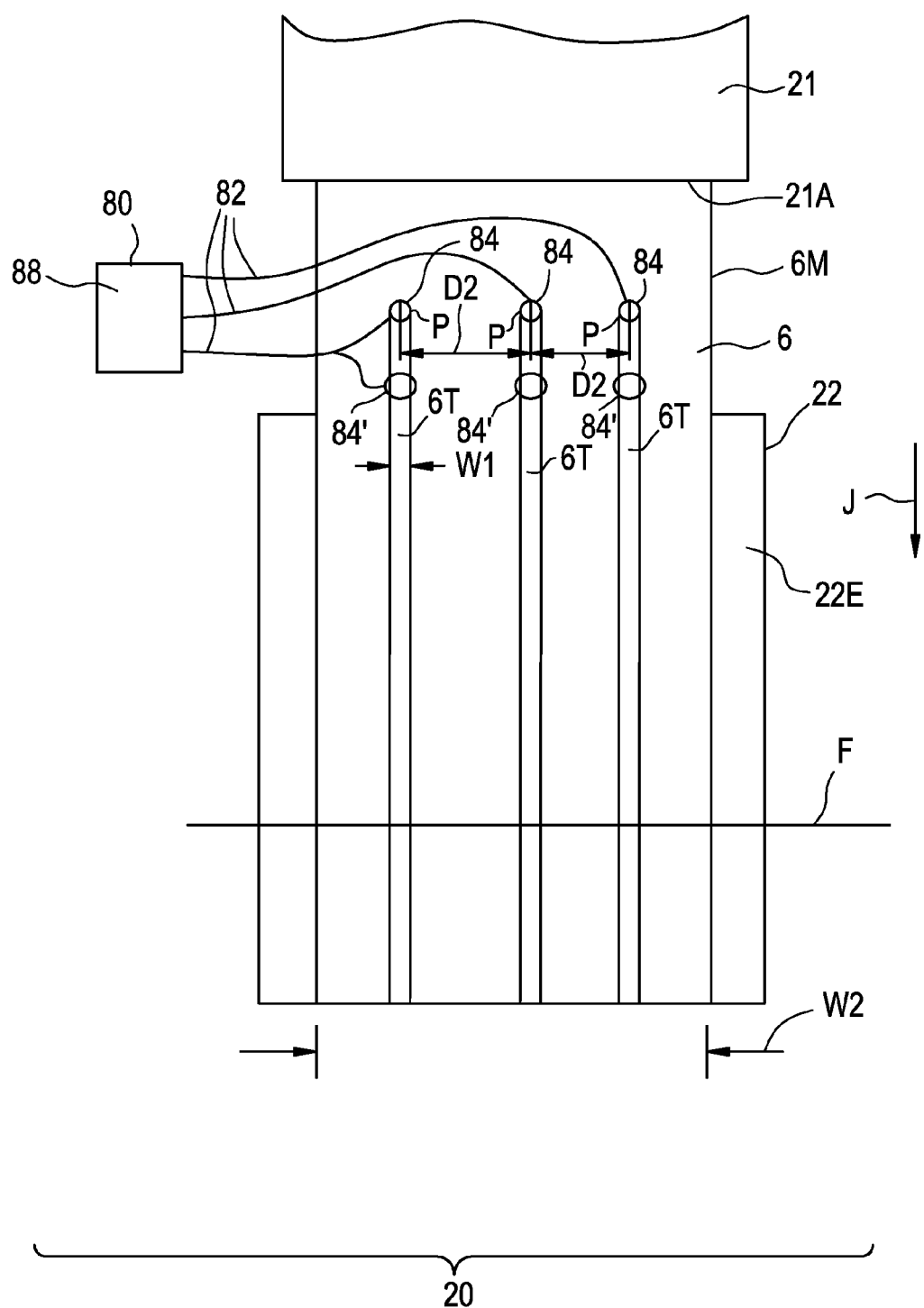
FIG. 5A is a front view of the die and casting drum of FIG. 4A taken across line 3-3.
Figure 6B:
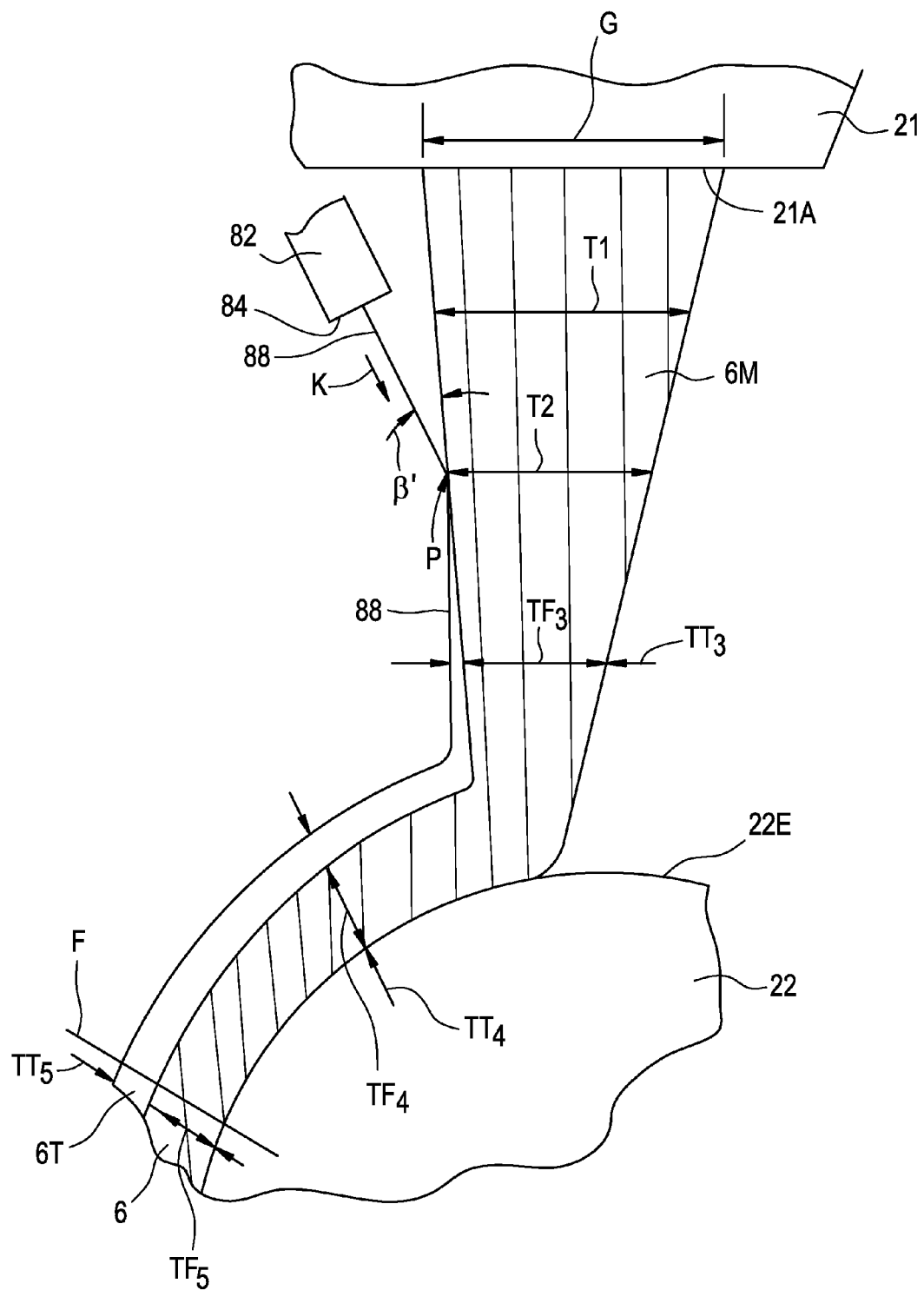
FIG. 6B is an enlarged partial cross sectional view of a portion of the pre-stretch film processing apparatus of FIG. 4A, showing the coolant impinging the film at an acute angle.

As shown in FIGS. 4A and 5A, the film delivery section 20 includes a coolant supply 80 (e.g., a tank or vessel) containing a suitable coolant 88. A plurality of conduits 82 extend from the coolant supply vessel 80 and terminate at separate coolant discharge outlets 84 and 84'. As best shown in FIG. 5A, each pair of the coolant discharge outlets 84 and 84' are aligned along a common arcuate path as shown by the arrow J. In one embodiment, the coolant discharge outlets 84 and 84' are nozzles. The coolant discharge outlets 84 and 84' are positioned between the die outlet 21A and the exterior surface 22E of the drum 22. The coolant discharge outlets 84 and 84' are spaced apart from the molten material 6M by a horizontally adjustable distance D1 as shown in FIG. 4A. The coolant discharge outlets 84 and 84' are spaced laterally apart from one another by laterally adjustable distance D2 as shown in FIG. 5A. A stream of the coolant 88 is discharged from each of the coolant discharge outlets 84 and 84' so that the stream impinges on (at a point of impingement P for 84 and P' for 84') and accelerates a rate of cooling and solidification of a localized strip 6T of the molten material 6M, as compared to remaining portions of the molten material 6M which cool and solidify at a lesser rate. As shown in FIG. 5A the strip has a width W1 and the film has an overall width of W2. The coolant 88 is shown impinging the molten material 6M at an angle β of about 90 degrees, as shown in FIG. 6A. However, as shown in FIGS. 4B and 6B, other angles of impingement may be employed such as but not limited to an acute angle β' of 10 degrees or less especially when a liquid is used as a coolant to avoid marking of the film. The coolant 88 can be discharged from the coolant discharge outlets 84 and 84' of the coolant supply vessel 80 at a constant rate or pulsed at a variable rate.

Figure 4C:
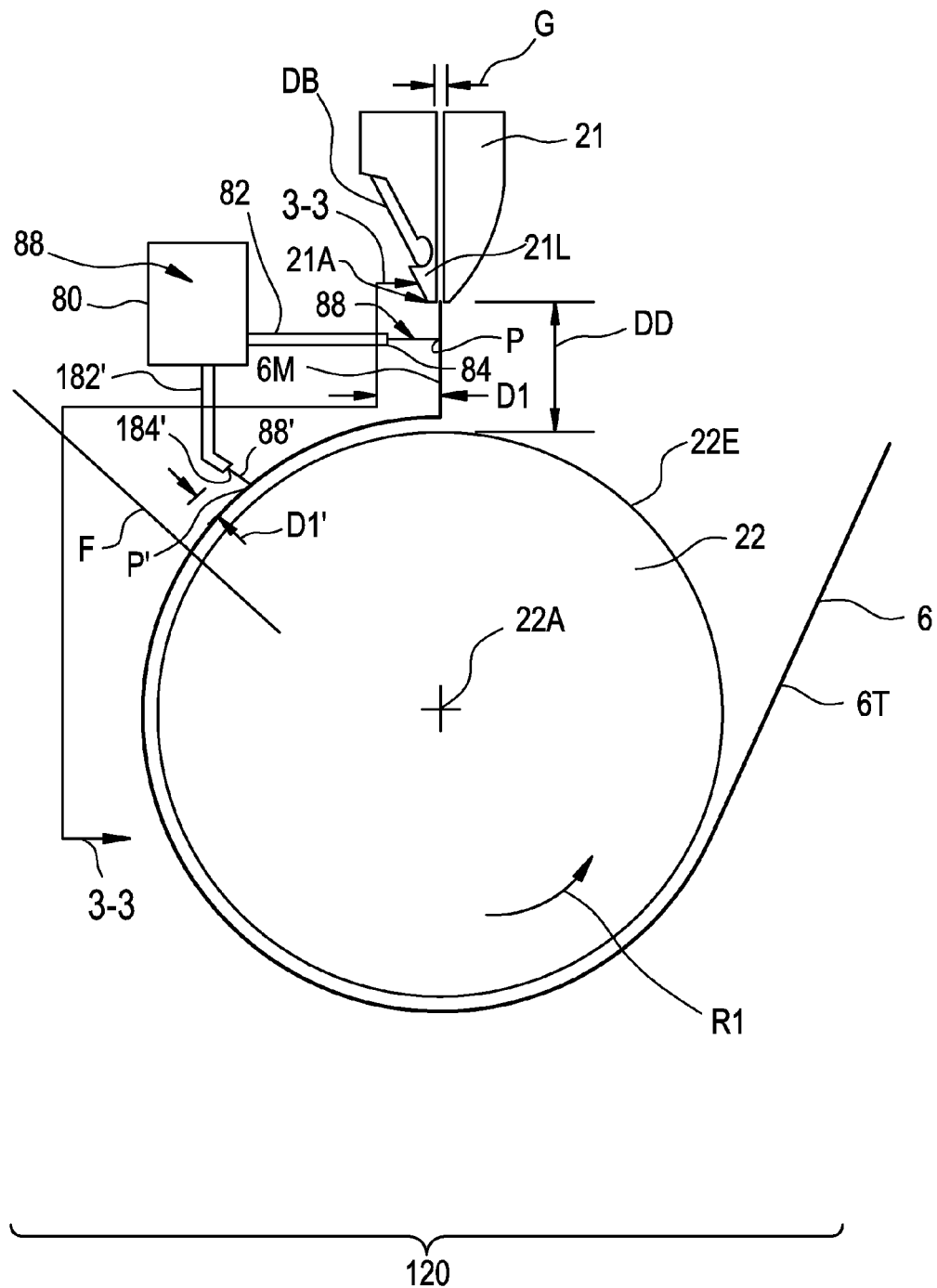
FIG. 4C is a schematic cross sectional view of a die and casting drum of the pre-stretch film processing apparatus of FIG. 3A showing a coolant being applied at multiple points of impingement.
Figure 5B:
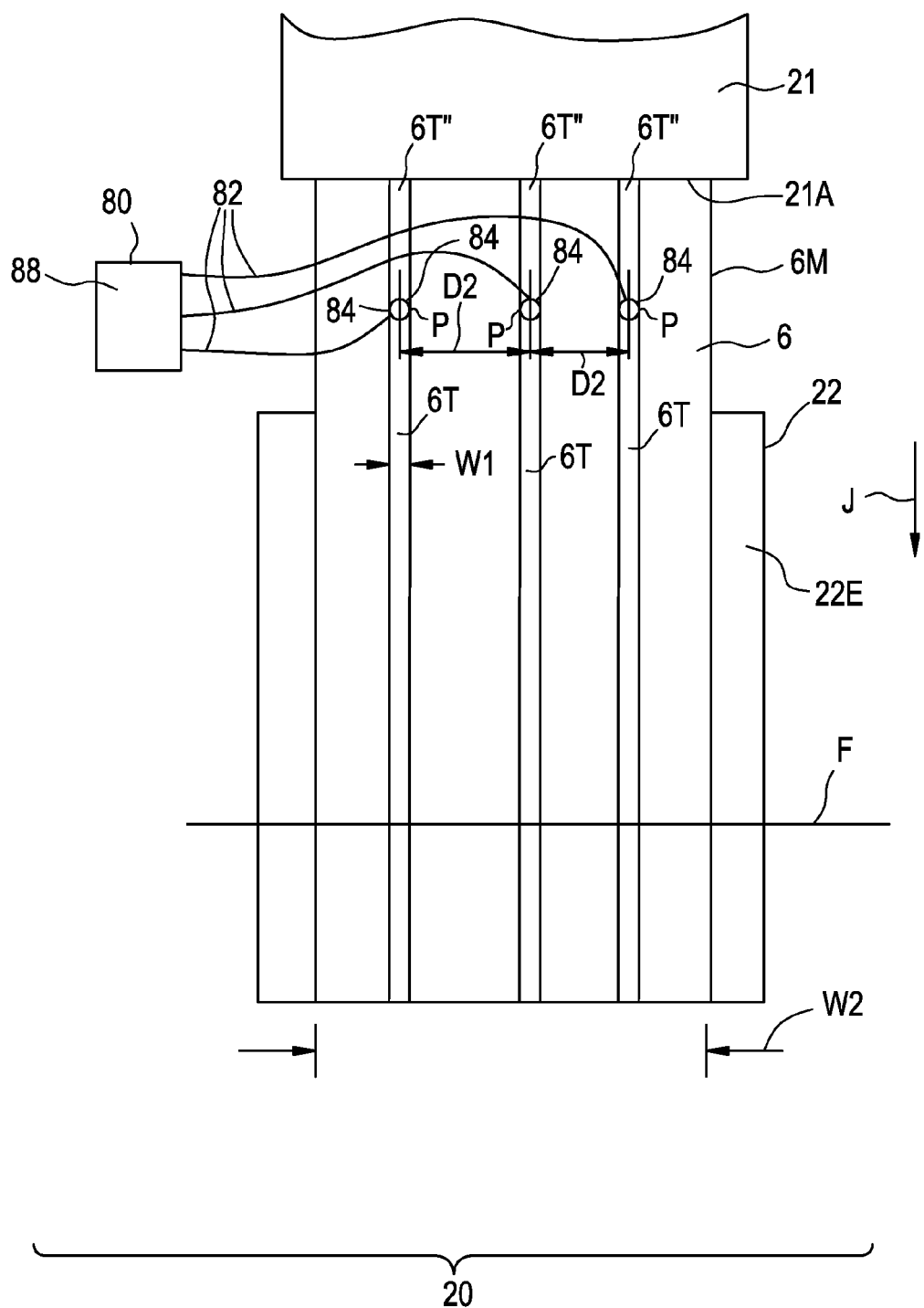
FIG. 5B is another embodiment of the die and casting drum of FIG. 5A wherein the film from the die exit already includes thickened strips and the thickened strips are cooled with a coolant.
Figure 5C:
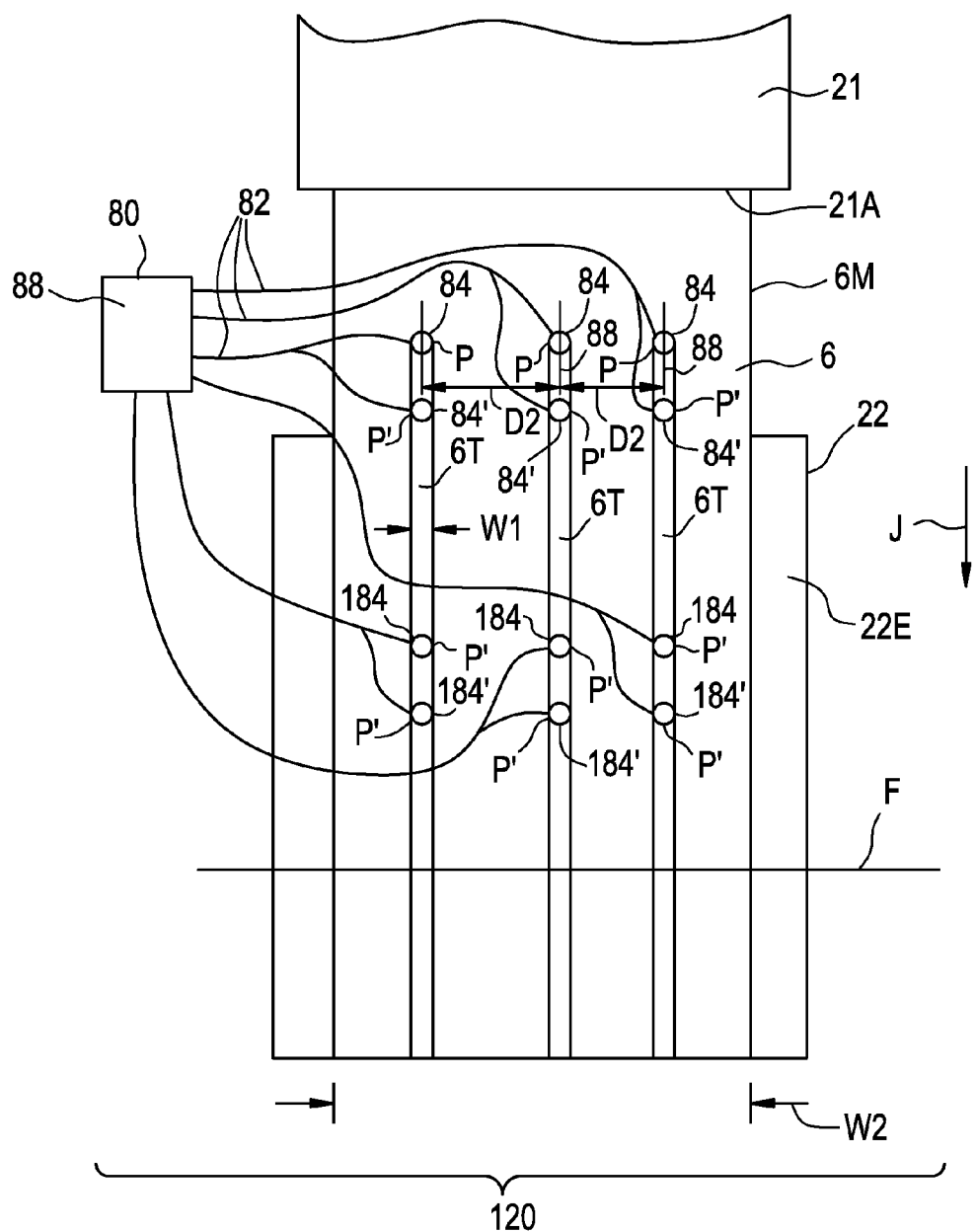
FIG. 5C is a schematic front view of the die and casting drum of FIG. 4C showing a first coolant impinging the molten polymer between the die outlet and the casting drum and second coolant impinging the molten polymer on the casting drum.

As shown in FIGS. 4C and 5C a film delivery section 120 is similar to the film delivery section 20 of FIGS. 4A, 4B, 5A and 5B except that there are two sets of conduits 82 and 182' communicating with the coolant supply 80. The conduits 82 are configured to supply coolant 88 to the molten film 6M between the outlet 21A of the die 21 and the drum 22, as described herein with reference to FIGS. 4A, 4B, 5A, 5B, 6A and 6B. The conduits 182' are configured to supply the coolant 88 to the molten film 6M while the molten film 6M is positioned on the drum 22. The plurality of conduits 182' extend from the coolant supply vessel 80 and terminate at separate coolant discharge outlets 184 and 184'. As best shown in FIG. 5C, each pair of the coolant discharge outlets 184 and 184' are aligned along a common arcuate path as shown by the arrow J. In one embodiment, the coolant discharge outlets 184 and 184' are nozzles. The coolant discharge outlets 184 and 184' are positioned over the drum 22. The coolant discharge outlets 184 and 184' are spaced apart from the molten material 6M by an adjustable distance D1' as shown in FIG. 4C. The coolant discharge outlets 184 are spaced laterally apart from one another by laterally adjustable distance D2 as shown in FIG. 5C. The coolant discharge outlets 184' are spaced laterally apart from one another by laterally adjustable distance D2 as shown in FIG. 5C As shown in FIGS. 4C and 5C streams of the coolant 88 are discharged from each of the coolant discharge outlets 84 so that the stream impinges on (at a point of impingement P') and accelerates a rate of cooling and solidification of a localized strip 6T of the molten material 6M, as compared to remaining portions of the molten material 6M which cool and solidify at a lesser rate.

While coolant discharge outlets 84 and 84' are described and shown as being spaced apart from the molten material 6M by a distance D1, the present invention is not limited in this regard as the distance D1 can be variable. While the coolant discharge outlets 84 and 84' are shown and described as being spaced laterally apart from one another by a distance D2, the present invention is not limited in this regard as the distance D2 may be variable.

Any suitable coolant 88 can be used including but not limited to a chilled gas and/or a chilled liquid. In one embodiment the chilled gas includes air. In one embodiment the chilled gas includes nitrogen. In one embodiment the chilled liquid includes water. In one embodiment the coolant 88 is an aerosol. In one embodiment the coolant 88 is a mist of a liquid and a gas.

As shown in FIG. 6A, the molten material 6M is discharged from the outlet 21A of the die 21. The molten material 6M decreases in thickness as it is pulled onto the drum 22. For example, the molten material 6M has a thickness $T_1$ at a point between the outlet 21A of the die 21 and a point P of impingement of the stream of coolant 88. At the point P of impingement the molten material 6M has a thickness $T_2$ which is less than $T_1$. At a point between the point P of impingement and the drum 22 a portion of the molten material 6M solidifies along the strip 6T. The strip 6T decreases in thickness at a lesser rate than the remaining portions of the molten material 6M. Thus, at the point between the point P of impingement and the drum 22 the molten material has a thickness $TF_3$, whereas the strip 6T has a greater thickness $TT_3$. When the molten material 6M engages the exterior surface 22E of the drum 22, solidification gradually progresses until the molten material 6M is fully solidified at a freeze line F on the drum 22. Prior to the freeze line F the molten material 6M has a thickness $TF_4$ and the strip 6T has a thickness $TT_4$. As shown in FIGS. 4A and 4B, the molten material 6M and the strip 6T each become progressively thinner between the point of impingement P and after the molten material 6M engages the drum 22. In particular, the thickness of the molten material decreases from $TF_3$ to $TF_4$ and the thickness of the strip 6T decreases from $TT_3$ to $TT_4$. While on the drum 22, the molten material 6M and the strip 6T continue to become thinner due to stretching and contraction due to cooling. In particular, the thickness of the molten material decreases from $TF_4$ to $TF_5$ and the thickness of the strip 6T decreases from $TT_4$ to $TT_5$. The localized cooling of the strip 6T causes the strip 6T to be of an increased thickness compared to the remaining portions of the film 6.

Referring to FIG. 4B, when a liquid is employed for the coolant 88, after the coolant 88 impinges the molten material at the point of impingement P at the acute angle β', the coolant 88 drips along the strip 6T as indicated by the arrows M. At a bottom B of the drum 22 the coolant 88 drips off the drum in a stream and/or droplets 88P. A collection bin 89 is positioned under the drum 22 for collection of the stream and/or droplets 88P. A return line 83 is in communication with the collection bin 89 to convey the coolant away from the collection bin 89. A pump 85 is positioned in the return line 83 for pumping the coolant 88 to a heat exchanger 87 positioned downstream of the pump 85. The heat exchanger 87 includes an inlet 87A and an outlet 87B for conveying another coolant medium (e.g., chilled water from a cooling tower or a chiller) for cooling the coolant 88. The heat exchanger 87 is in communication with the coolant supply 80 for replenishing coolant 88 therein.

As shown in FIG. 3A, the film delivery section 20 includes one or more delivery rollers 23, for example two idler rollers 23A and 23B over which the film 6, with the strips 6T having increased thickness relative to the remainder of the film 6, is discharged from the delivery section 20 in the general direction of arrows F1 and F2 to the film stretching section 30.

As illustrated in FIG. 3A, the film stretching section 30 includes five stretching rollers 34A, 34B, 34C, 34D and 34E. The stretching rollers 34A (i.e., a first stretching roller), 34B (a second stretching roller), 34C (a third stretching roller), 34D (a fourth stretching roller), and 34E (a fifth or last stretching roller) are rotated at different surface speeds to cause the film 6 to stretch beyond the yield point of the material. For example, the last stretching roller 34E is rotated at a surface speed greater than that of the fourth stretching roller 34D; the fourth stretching roller 34D is rotated at a surface speed greater than that of the third stretching roller 34C; the third stretching roller 34C is rotated at a surface speed greater than that of second stretching roller 34B; and/or the second stretching roller 34B is rotated at a surface speed greater than that of the first stretching roller 34A. In one embodiment, the surface speeds of the stretching rollers 34A, 34B, 34C, 34D and 34E are selectively adjusted to a predetermined magnitude to cause the surface speed of the last stretching roller 34E to exceed the surface speed of the first stretching roller 34A by about 200 percent to about 400 percent. While the surface speed of the last stretching roller 34E is said to exceed the surface speed of the first stretching roller 34A by about 200 percent to about 400 percent, the present invention is not limited in this regard as any ratio of speeds sufficient to stretch the film 6 may be employed including but not limited to the surface speed of the last stretching roller 34E exceeding the surface speed of the first stretching roller 34A by about 200 percent or more, at least 250 percent, at least 275 percent or up to about 400 percent. The speeds of the rollers 34A, 34B, 34C, 34D and 34E are directly proportional to the amount of stretching. Thus, the film 6 is stretched from between 50 percent and about 250 percent, 275 percent, 300 percent or 400 percent or any percent between those ratios. While five stretch rollers are shown and described the present invention is not limited in this regard as other numbers of rollers may be employed including but not limited to two, three, four or more stretch rollers.

In one embodiment, heat may be added to the film stretching section 30 to soften the film 6 for the purpose of stretching more easily or to attain various stiffness properties.

Figure 1:
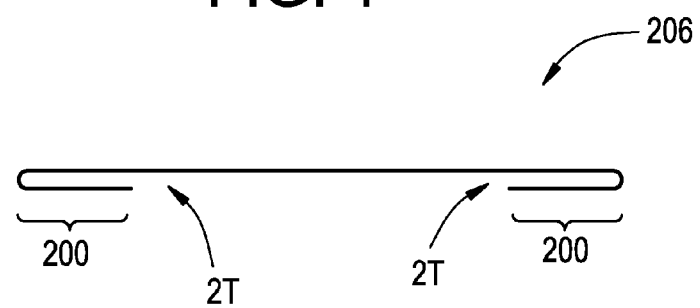
FIG. 1 is a schematic illustration of a section of film with folded edges.
Figure 2A:
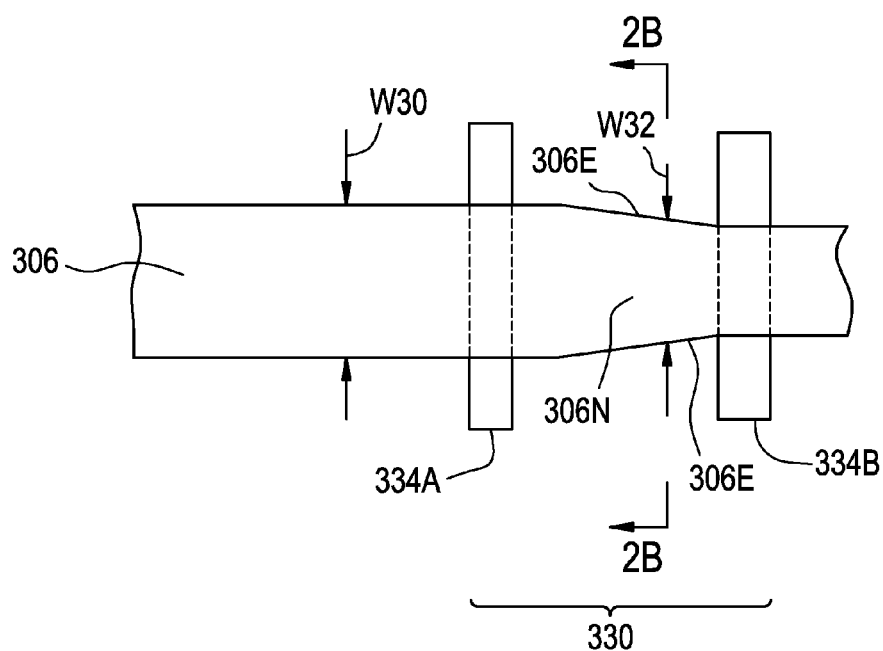
FIG. 2A is a schematic illustration of a section of film with thickened edges formed via a neck-in process during stretching.
Figure 2B:
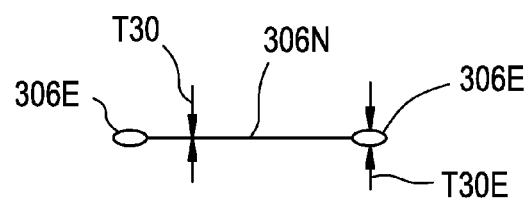
FIG. 2B is a cross sectional view of the film of FIG. 2A taken across line 2B-2B.

As illustrated in FIG. 3A, the stretching rollers 34A, 34B, 34C, 34D and 34E are rotated and the film is fed in a serpentine way as to allow close coupled stretching of the film between each of the stretching rollers. In the example embodiment shown in FIG. 1, the first stretching roller 34A is rotated in a counter clockwise direction RA and the film is fed in the counter clockwise direction RA over a bottom portion of the first stretching roller 34A; the second stretching roller 34B is rotated in a clockwise direction RB and the film 6 is fed in the clockwise direction RB over a top portion of the stretching roller 34B; the third stretching roller 34C is rotated in a clockwise direction and the film is fed in a clockwise direction over a top portion of the third stretching roller 34C; the fourth stretching roller 34D is rotated in a counter clockwise direction RD and the film is fed in the counter clockwise direction RD over a bottom portion of the fourth stretching roller 34D; and the fifth stretching roller 34E is rotated in a clockwise direction RE and the film is fed in the clockwise direction RE over a top portion of the fifth stretching roller 34E. For the purpose of controlling orientation rate and minimizing loss in width of the stretching process. The gap between each of the stretching rollers can be fixed or adjustable to 0 to 20 mm and preferably is less than 10 mm, for example less than 10 mm to about zero. In one embodiment the spacing is less than 5 mm.

Referring to FIG. 3A, the film receiving section 40 includes a relaxation sub-section 40A and a winder 42. The relaxation section includes a pull roller 48B, a relaxation roller 41C and an idler roller 48A, between which the film is relaxed and creating a low tension region 43 between the pull roller 48B and relaxation roller 41C, prior to winding on the winder 42.

As illustrated in FIGS. 3A and 7, a slitting device 33 is disposed within the film stretching section 30 between the inlet 31 and the outlet 32, for example the slitting device 33 is positioned between the second stretching roller 34B and the third stretching roller 34C.

As illustrated in FIG. 7, the film 6 having a width W3 is fed to the stretching section 30. The slitting device 33 is positioned between the second stretching roller 34B and the third stretching roller 34C. A portion of the slitting device 33 extends through and cuts the film 6 into two strips 6P1 and 6P2 (collectively referred to as the slit film 6P) as the film 6 travels past the slitting device 33 in the general direction of the arrow F3. When the film 6 is initially slit, the strips 6P1 and 6P2 have initial widths of W4. After the strips 6P1 and 6P2 are stretched by traveling through the stretching rollers 34C and 34D, the strips 6P1 and 6P2 become more narrow (e.g., neck-in) and have a second width W5 (e.g., 17.6 inches, 440 mm), which is less than the width W4 (e.g., 20 inches, 500 mm). The strips 6P1 and 6P2 continue to become more narrow (third width W6) as the strips are further stretched as a result of travel over the stretching roller 34E. The reduction in width due to neck-in adds to the thickness of the edges of 6E.

Increasing the spacing (e.g., gap) between the stretching rollers 34A, 34B, 34C, 34D and 34E results an increased chord length of the film and increased neck-in. Decreasing the spacing (e.g., gap) between the stretching rollers 34A, 34B, 34C, 34D and 34E results a decreased chord length of the film and decreased neck-in. In particular, while stretching the film 50 to 400 percent decreasing the gap between the stretching rollers to less than 5 mm results in less than 10 percent reduction in width. The decreasing of the gap between the stretching rollers to less than 5 mm also results in thinner edges as compared to those of film stretched with gaps larger than 5 mm. In one embodiment, the spacing is about 0 to 20 mm. In one embodiment, decreasing the gap between the stretching rollers to less than 5 mm results in less than 15 percent reduction in width In one embodiment, decreasing the gap between the stretching rollers to less than 5 mm results in less than 20 percent reduction in width While stretching of the film 50 to 400 percent is described, the present invention is not limited in this regard as the film may be stretched different percentages including but not limited to 200 to 300 percent.

Figure 8:
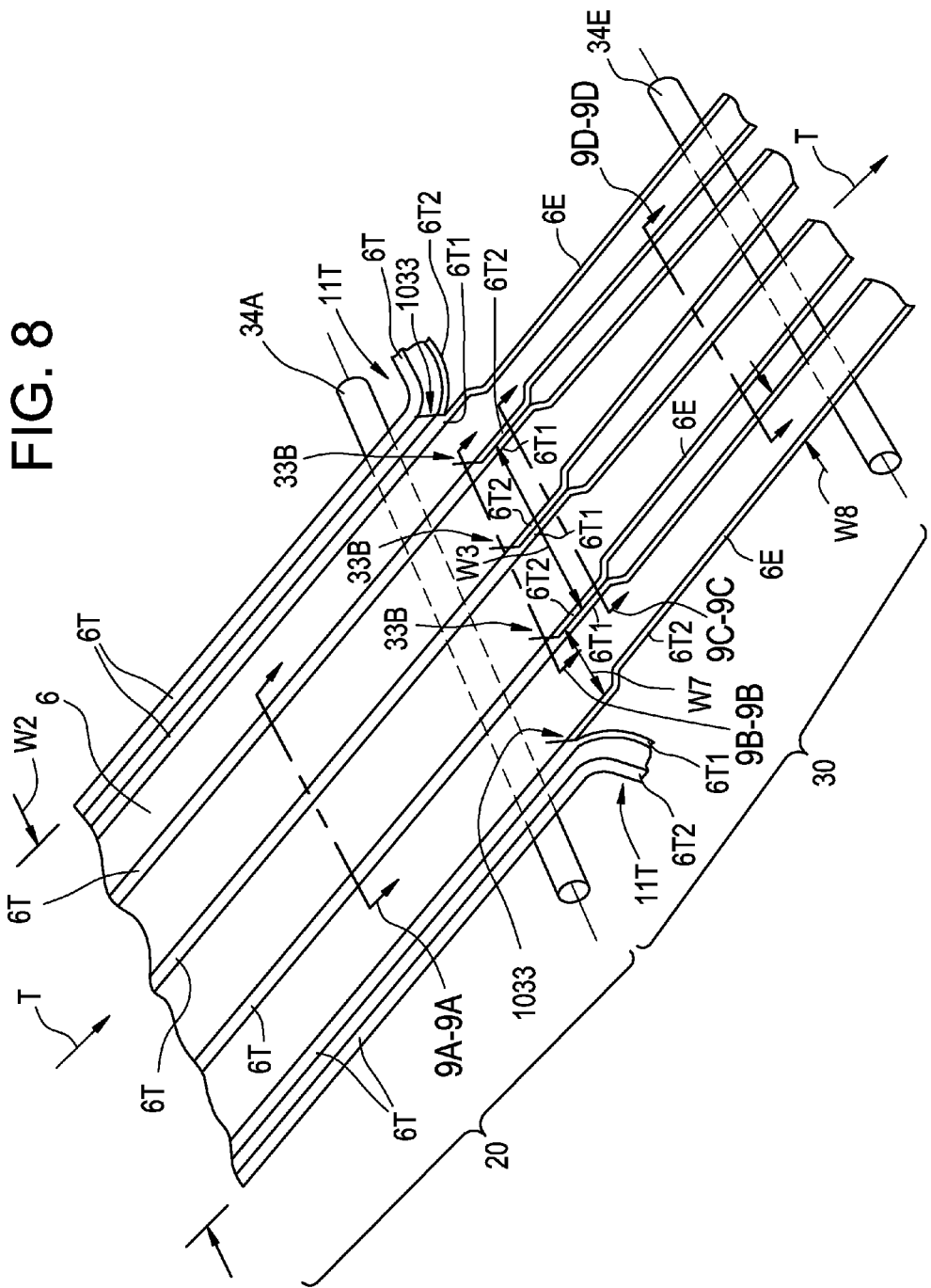
FIG. 8 is a perspective view of a portion of another film processing system for producing pre-stretch film with thickened strips.

As shown in FIG. 8, the film 6 with the thickened film strips 6T are pulled off of the drum 22 (shown in FIG. 3) in the direction indicated by the arrow T towards the film stretching section 30. In FIG. 8, only two rollers (i.e., stretching rollers 34A and 34E) are shown for simplicity. However, the present invention is not limited in this regard as the stretching rollers 34B, 34C and 34D or any other number of stretching rollers and/or idler rollers may be employed in the film stretching section 30. In the exemplary embodiment shown in FIG. 8, the slitting device 33 is positioned in the film stretching section 30 between the stretching rollers 34A and 34E. The film slitting device 33 has the cutting blade 33B positioned to slit the thickened film strip 6T into a first thickened edge 6T1 and a second thickened edge 6T2 of a plurality of film sections each having a width W4. After the film 6, the first thickened edge 6T1 and the second thickened edge 6T2 enter the film stretching section 30, the film necks down to a width W8.

In one embodiment, side film edges (e.g., edge trim) 11T are slit or trimmed off with a slitting device 1033, in the film stretching device 30 and before slitting of the thickened film strips 6T with the film slitting devices 33.

Figure 9A:
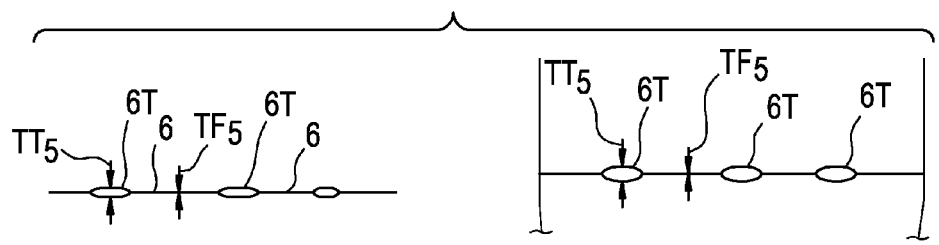
FIG. 9A is a cross sectional view of the film of FIG. 8 taken across line 9A-9A, before stretching.
Figure 9B:
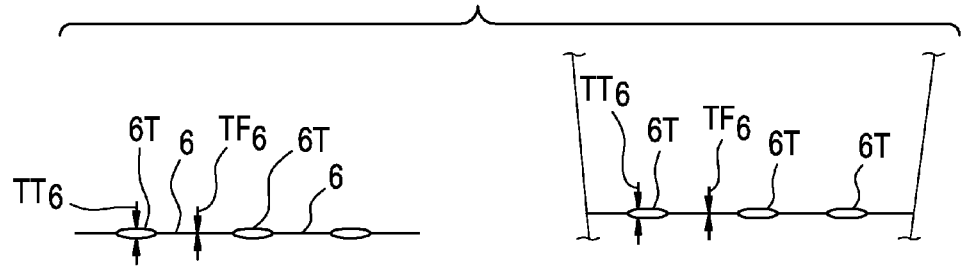
FIG. 9B is a cross sectional view of the film of FIG. 8 taken across line 9B-9B after initial stretching and before slitting.
Figure 9C:
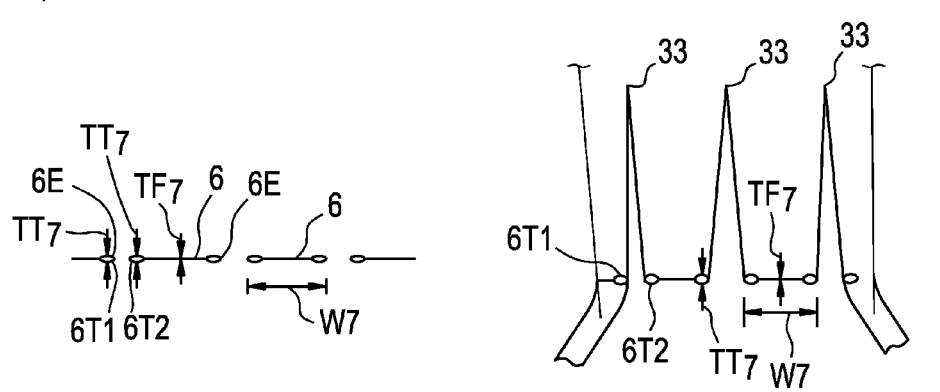
FIG. 9C is a cross sectional view of the film of FIG. 8 taken across line 9C-9C after slitting.
Figure 9D:
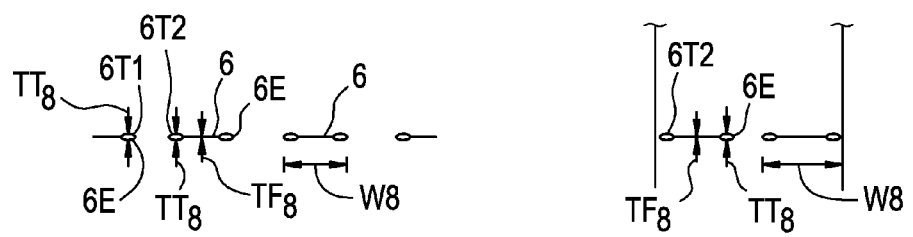
FIG. 9D is a cross sectional view of the film of FIG. 8 taken across line 9D-9D after slitting and after additional stretching.

Referring to FIGS. 9A, 9B, 9C and 9D a progressive change in thickness of the film 6, strips of increased thickness 6T, and the slit strips of increased thickness 6T1 and 6T2 are illustrated. Referring to FIG. 9A, before entering the stretching section 30, the strips of increased thickness 6T have a thickness $TT_5$ and the film has a thickness of $TF_5$. Referring to FIG. 9B, after initial entry into the film stretching section 30, the strips of increased thickness 6T have a thickness $TT_6$ and the film has a thickness of $TF_6$. Referring to FIG. 9C, after initial entry into the film stretching section 30 and after slitting, the slit strips of increased thickness 6T1 and 6T2 have a thickness $TT_7$ and the film has a thickness of $TF_7$. Referring to FIG. 9D, additional stretching in the stretching section 30, the slit strips of increased thickness 6T1 and 6T2 have a thickness $TT_8$ and the film has a thickness of $TF_8$. $TT_8$ is less than $TT_7$. $TT_7$ is less than $TT_6$. $TT_6$ is less than $TT_5$. $TT_8$ is less than $TT_7$. $TF_7$ is less than $TF_6$. $TF_6$ is less than $TF_5$. $TT_5$ is greater than $TF_5$. $TT_6$ is greater than $TF_6$. $TT_7$ is greater than $TF_7$. $TT_8$ is greater than $TF_8$. In one embodiment, after 250 percent stretching the film (i.e., a film having no strips of increased thickness 6T1 and 6T2), the thickness of each of the edges 6E is 50 to 100 percent more than the thickness of the film 6. However, the film 6 with the strips of increased thickness 6T1 and 6T2 acquires the same magnitude of edge thickening with more stretching. For example, after 300 percent stretching the film having the strips of increased thickness 6T1 and 6T2, the thickness of the edges 6E is 50 to 100 percent more than the thickness of the film 6.

Referring to FIG. 7, the amount of neck-in is controlled by the magnitude of spacing between the stretching rollers 34A, 34B, 34C, 34D and 34E and/or the size (e.g., diameter) of the stretching rollers. The effective chord length of the film 6 depends upon spacing between adjacent stretching rollers 34A, 34B, 34C, 34D and 34E. Chord length is an unsupported length of film extending between but not engaging adjacent pairs of the stretching rollers 34A, 34B, 34C, 34D and 34E. Stretching the film 6 between the stretching rollers 34A, 34B, 34C, 34D and 34E causes neck-in. Neck-in does not occur while the film is in contact with the stretching rollers 34A, 34B, 34C, 34D and 34E. Instead, the neck-in occurs on the chord length of the film 6. Larger diameter stretching rollers 34A, 34B, 34C, 34D and 34E results in increased neck-in compared to stretching rollers of lesser diameters. As the amount of stretching increases, the thickness of the film as well as that of the edges 6E of the film 6 decreases. However the thickness of the film 6 decreases more than the decrease in thickness of the edges 6E because the neck-in phenomenon which adds thickness to the free edges of the film 6E. Thus, stretching of the film results in the edges 6E being thicker than the film 6. However, an increased amount of neck-in reduces the yield (i.e., yield or loss in width due to stretching the film is defined as the width of the final prestreched film divided by the width of the film prior to stretching) of the film 6.

Prior to the present invention, those skilled in the relevant art were discouraged from adding material to thicken and strengthen the edges 6E of the film 6 and from folding the edges 6E of the film 6 to thicken and strengthen the edges 6E of the film, because during stretching the edges 6E would naturally be thicker than the film as a result of neck-in. However, the inventors have discovered that the yield of the film can be increased by setting the spacing between adjacent pairs of the stretching rollers 34A, 34B, 34C, 34D and 34E to be less than 5 mm to minimize neck-in. In one embodiment, the spacing is about 0 to 20 mm. As a result, film neck-in reduces and the natural thickening of the edges is also reduced. However, the inventors have compensated for the loss of the naturally thicker edges (i.e., the naturally thicker edges due to stretching and neck-in) by using a film 6 having the strips of increased thickness 6T.

The use of the thickened edges 6T1 and 6T2 allows for a greater thinning out and stiffening of the film 6, by stretching in the film stretching section 30. Thus, the loss of natural edge thickening due to less neck-in due to reducing the diameter of the stretching rollers as well as the gap between the stretching rollers during stretching is made up by having the thickened edges 6T1 and 6T2. Thus, the present invention includes a method for producing a pre-stretch film. The method includes providing a film 6 suitable for producing pre-stretch film and having the thickened film strip 6T. The thickened film strip 6T is slit to form a first 6 thickened edge 6T1 and a second thickened edge 6T2. The film 6 is thinned out by stretching between the stretching rollers rotated at different speeds, setting a spacing between the stretching rollers to be less than 5 mm and selecting a diameter of the stretching rollers.

Figure 10A:
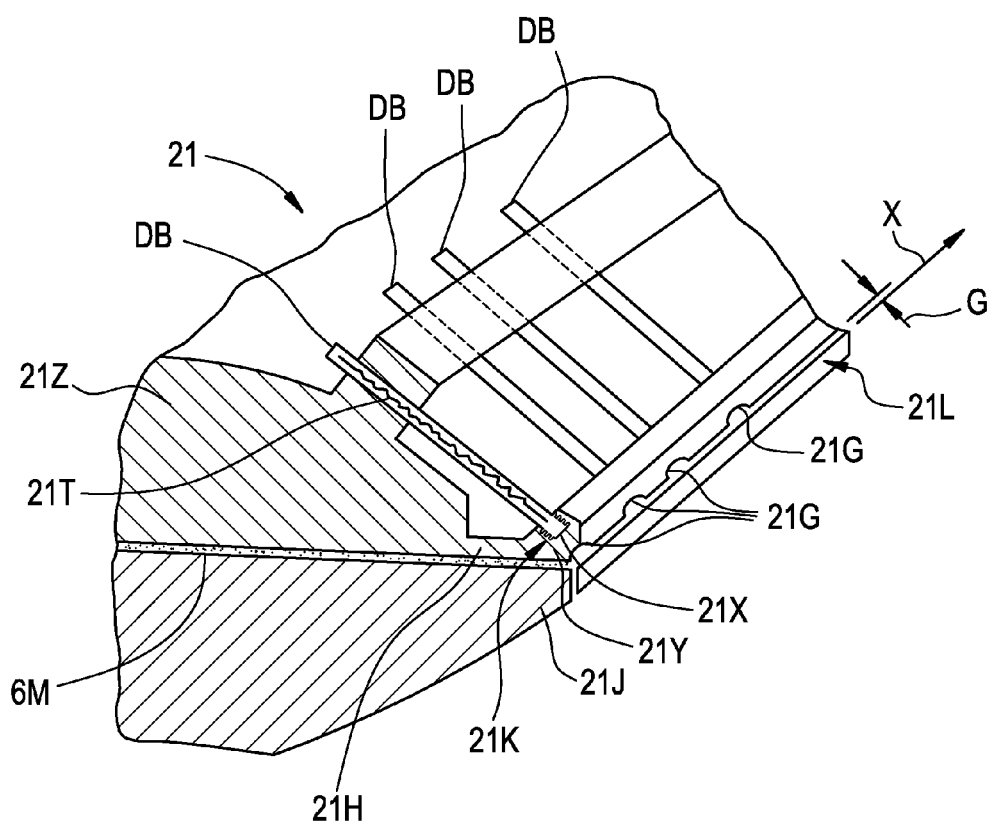
FIG. 10A is a schematic illustration of localized increases in die gap at the die exit using multiple die bolts in the flexible die jaw to locally increase the die gap to create strips of increased thickness at those locations.
Figure 10B:
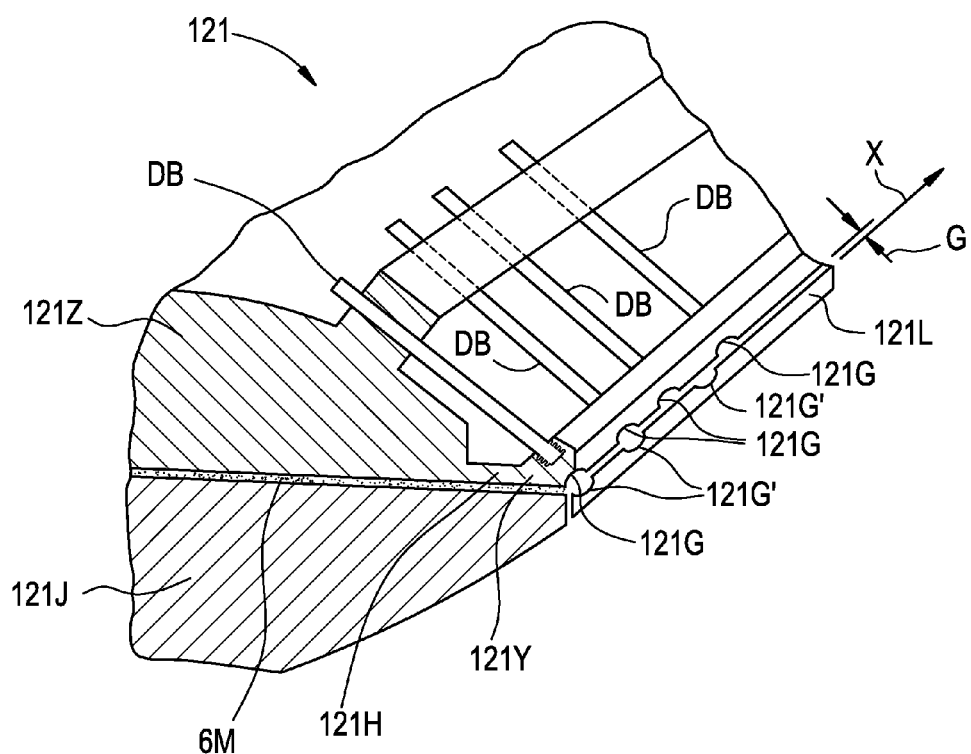
FIG. 10B is a schematic cross sectional view of a die lip with grooves permanently formed therein.
Figure 11:
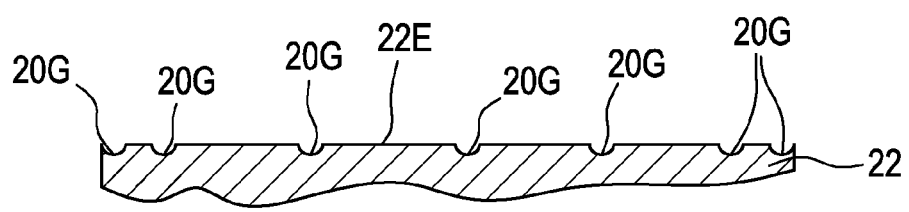
FIG. 11 is a cross sectional view of a surface of a cooling drum having grooves therein for forming strips of increased thickness.

While creating the strip 6T of an increased thickness is described herein as being accomplished by localized cooling of the film 6, the present invention is not limited in this regard as the thickness of the strip may be increased by other methods including but not limited to: 1) as shown in FIGS. 4A and 10A, selectively adjusting the magnitude of the die gap G via actuation of the die bolts DB to deform a die lip 21L at localized portions 21G of the die 21 to increase the flow of molten material 6M from the die 21 to form precursor thickened strips 6T'' prior to the point of impingement P (FIG. 5B); 2) forming grooves 20G in a surface 22E of a cooling drum 22 (FIG. 11); 3) forming grooves 121G and/or 121G' in a flexible jaw 121Z or a fixed jaw 121J at the die lip 121L (FIG. 10B); and 4) locally increasing the flow rate of molten polymer exiting the die lip 221L as described herein with reference to FIGS. 12A, 12B, 12C and 12D.

Referring to FIG. 10A, the die 21 has the fixed jaw 21J and the flexible jaw 21K which is spaced apart from the fixed jaw 21J, thereby defining the die gap G at the die lip 21L. The flexible jaw 21K includes a head portion 21Y which is moveably secured to a base portion 21Z by a flexible hinge 21H. A plurality of die bolts DB extend between and are secured to the head portion 21Y and the base portion 21X. For example, one end of the die bolt DB is threaded into the head portion 21Y at a point 21X. Each of the die bolts DB is in communication with an actuator 21T to move the die bolt DB. In one embodiment, the actuator 21T is a heater element disposed inside the die bolt DB to extend and contract the length of the die bolt DB by thermal expansion and contraction. Movement of the die bolt DB causes localized deformation in the head portion 21Y which creates a depression or groove 21G in the head portion 21Y at the die lip 21L in alignment with the die bolt DB. For illustration, four die bolts DB and four depressions 21G are shown. However, the present invention is not limited in this regard as any number of die bolts DB and depressions 21G at any spacing may be employed. A molten polymer 6M is extruded through the die lip 21L with strips of increased thickness 6T'' as shown in FIG. 5B.

Referring to FIG. 10 B a die 121 is similar to the die 21 of FIG. 10A except that the die 121 includes permanent grooves 121G cut or formed into the flexible jaw 121Z at the die lip 121L. In one embodiment, the die 121 includes permanent grooves 121G' formed in the fixed jaw 121J at the die lip 121L.

Figure 10C:
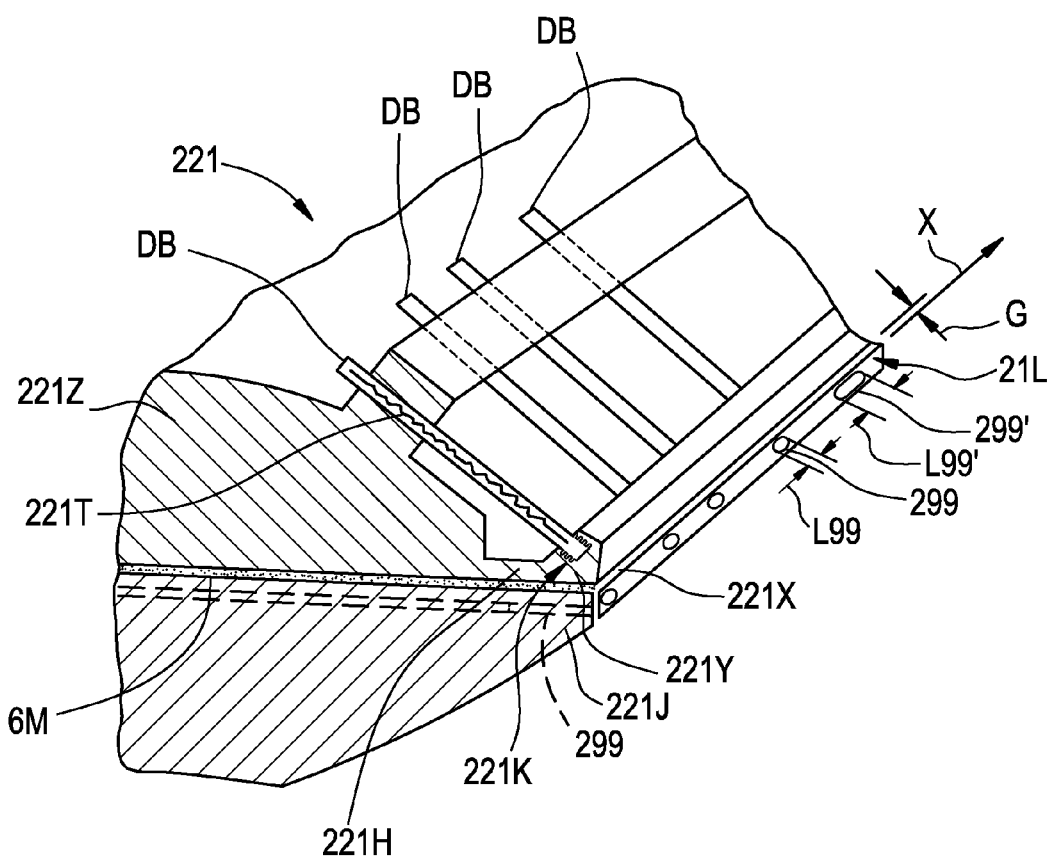
FIG. 10C illustrates another embodiment of a die for producing strips of increased thickness via adding via locally heating and/or cooling the molten film flow inside the die prior to exiting the die to increase flow of molten polymer from the die.

Referring to FIG. 10C a die 221 is similar to the die 21 of FIG. 10A except that the die 221 includes a plurality of heat exchangers 299 and 299' disposed in the fixed jaw 221J proximate the die lip 221L. In one embodiment, the die 221 includes plurality of heat exchangers 299 and 299' disposed in the flexible jaw 221Z proximate the die lip 121L. The heat exchangers 299 and 299' are spaced apart from one another. The heat exchangers 299 extend a length L99 along the X axis and the heat exchangers 299' extend a length L99' along the X axis. The heat exchangers 299 and 299' are configured to heat a portion of the fixed jaw 221J and/or a portion of the flexible jaw 221Z adjacent to the die lip 221L to locally and/or selectively heat the molten polymer 6M. The inventors have discovered that heating the molten polymer 6M locally and/or selectively causes local and selective increases in flow rate of the molten polymer 6M to create thickened strips of the molten polymer exiting the die lip 221L. Conversely, local and/or selective cooling of the molten polymer 6M causes a decrease in flow thereof and thinner strips of the molten polymer 6M exiting the die lip 221L.

Figure 12A:
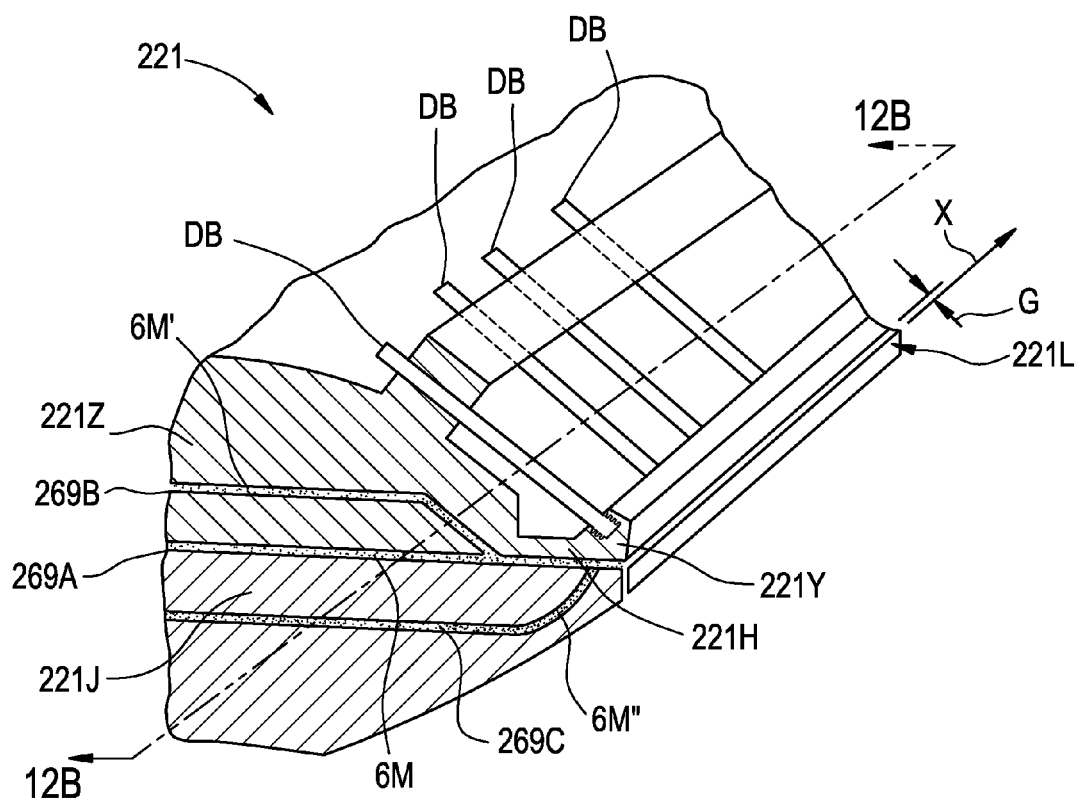
FIG. 12A illustrates another embodiment of a die for producing strips of increased thickness via adding strips of same or similar polymer at predetermined intervals into the main molten film flow inside the die prior to exiting the die.
Figure 12B:
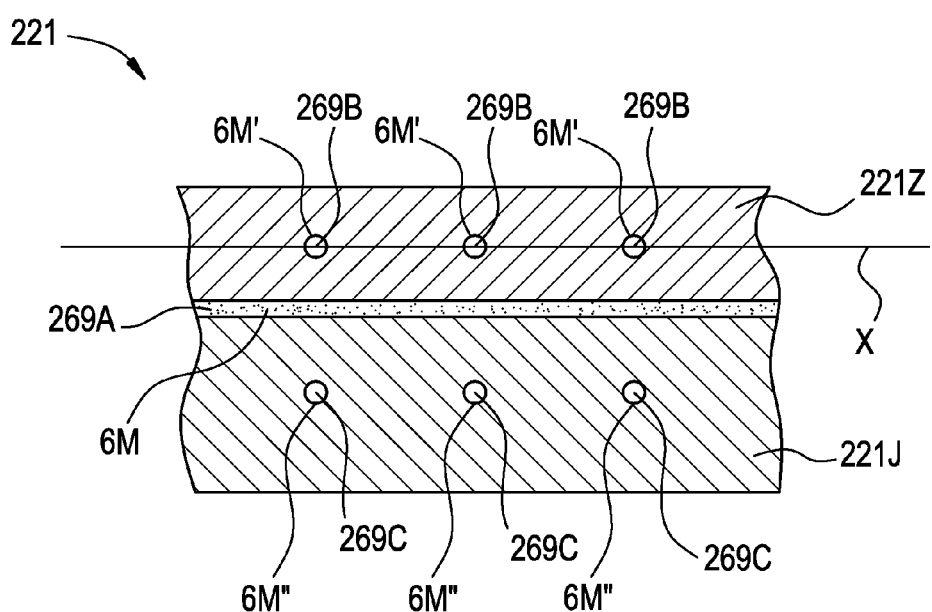
FIG. 12B is a cross sectional view of the die of FIG. 12A taken across line 12B-12B.
Figure 12C:
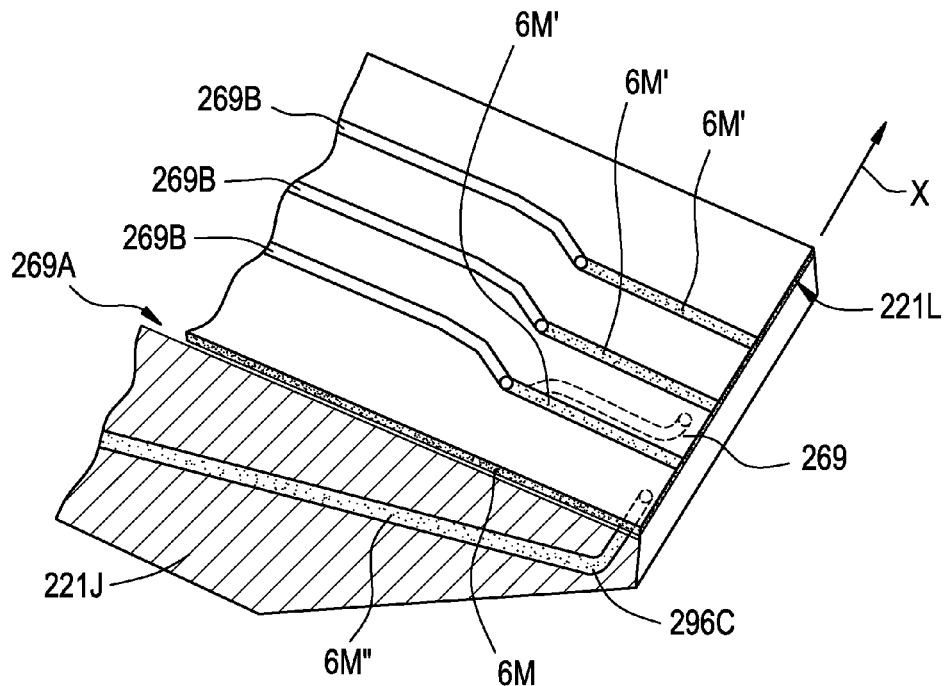
FIG. 12 C is a top perspective view of the die of FIG. 12A with the flexible jaw removed.
FIG. 12D is a graph of molten polymer flow rate on a Y axis as a function of distance on an X axis taken in a direction parallel to the die lip.

As shown in FIGS. 12A, 12B and 12C, the die 221 includes a main manifold 269A that extends longitudinally (along axis X) across the die 221 for discharging the molten material 6M therefrom. The die 221 also includes a plurality of second manifolds 269B that are spaced apart from one another in the longitudinal direction parallel to the axis X for discharging molten material 6M' therefrom. The die 221 also includes a plurality of third manifolds 269C that are spaced apart from one another in the longitudinal direction parallel to the axis X for discharging molten material 6M" therefrom. In one embodiment, the molten material 6M' and/or 6M" is of the same composition and has the same properties of the molten material 6M. In one embodiment, the molten material 6M has a different composition and has different properties of the molten material 6M' and/or 6M". The molten material 6M' is provided at a flow rate through the manifolds 269B added to a flow rate of the molten material 6M through the manifold 269A, sufficient to cause a localized thickening of the combined molten material exiting the die lip 221L. While the molten material 6M' is described as being provided at a flow rate through the manifolds 269B, the present invention is not limited in this regard as the flow rate of the molten film 6M' may be adjusted a different flow rates for different manifolds or may be varied with time. The molten material 6M" is provided at a flow rate through the manifolds 269C added to a flow rate of the molten material 6M through the manifold 269A, sufficient to cause a localized thickening of the combined molten material exiting the die lip 221L. In one embodiment, the combined molten material exiting the die lip 221L includes the molten material 6M, 6M' and/or 6M".

Figure 12D:
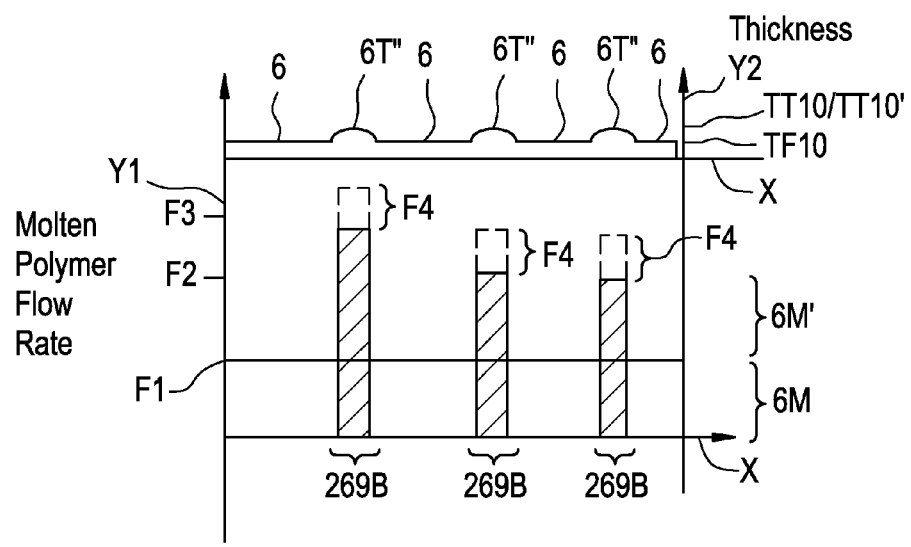

With reference to FIG. 12D, a graph illustrates flow rate of the molten polymer on a Y1 axis, thickness of the molten material exiting the die lip 221L on a second Y2 axis and position of the manifolds 269A and 269B on the X axis. The flow rate of the molten material 6M is shown as being a constant F1 along the X axis. The flow rate of the molten material 6M' from one of the manifolds 269B is shown having a flow rate F3 minus F1 and the flow rate from two of the manifolds 269B is shown as being F2 minus F1 which is less than F3. A total flow rate exiting the die lip 221 between the manifolds 269B is F1 resulting in a thickness of TF10. A total flow rate exiting the die lip 221 at one of the manifolds 269B is F2 resulting in a thickness of TT10'. In one embodiment, the molten material 6M" further adds a flow rate F4 to the flow rate exiting the die lip and to the thickness of the strips of increased thickness 6T".

Referring back to FIGS. 3A and 3B, the film receiving section 40 includes two idler rollers 41A and 41B over which the pre-stretch film 6 sections travels as the idler rollers 41A and 41B rotate. The film receiving section 40 includes a winding apparatus, for example, a drum 42 rotatably mounted about an axis 42A for winding the slit pre-stretch film 6P thereon. The slit pre-stretch film 6P is fed onto the drum 42 and is wound into separate reels.

The present invention also includes a method for maximizing a width of a pre-stretch film. The method includes providing polymer being suitable for producing the pre-stretch film. A pre-stretch film is produced with strips of increased thickness. A thickness of the strips 6T of increased thickness is coordinated with a formation of edge thickening caused by neck-in during stretching of the pre-stretch film.

Although the present invention has been disclosed and described with reference to certain embodiments thereof, it should be noted that other variations and modifications may be made, and it is intended that the following claims cover the variations and modifications within the true scope of the invention.

What is claimed is:

1. A method for maximizing a width of a film during stretching for a process of producing pre-stretch film for machine film and hand film wrapping applications, the method comprising:
   providing a polyolefin polymer having a melt flow index of 3-5, the polyolefin polymer being suitable for producing the pre-stretch film;
   producing the film using the polyolefin polymer, wherein the film is produced from the polyolefin polymer having the melt flow index of 3-5;
   before stretching and before slitting the film, forming strips of increased thickness in the film at locations where free edges are to be formed;
   slitting the strips of increased thickness to create the free edges in the strips of increased thickness;
   stretching the film 50-400 percent, the stretching being between at least two adjacent stretching sections, each stretching section having unheated stretching rolls, each unheated stretching roll being rotated at a different speed that progressively increase in a direction of stretching to achieve the 50-400 percent stretching of the film to create the pre-stretch film;
   setting a spacing between the unheated stretching rolls of each stretching section, the spacing being set to less than 5 mm to reduce neck-in based film width loss and reduce neck-in based edge thickening, and to cause a width of the stretched film to be less than 15 percent less than the film before stretching;
   the reduced neck-in of the film also resulting in reducing thickening of the free edges; and
   combining the reduced neck-in based thickening of the free edges and the strips of increased thickness to thicken the free edges 50 to 100 percent more than the thickness of the film between the free edges to produce a wider film with the 50 to 100 percent thicker free edges, compared to another film without the strips of increased thickness.

2. A method for maximizing a width of a film during stretching for the process of producing pre-stretch film for machine film and hand film wrapping applications, the method comprising:
   providing a polyolefin polymer having a melt flow index of 3-5, the polyolefin polymer being suitable for producing the pre-stretch film;
   producing the film using the polyolefin polymer, wherein the film is produced from the polyolefin polymer having the melt flow index of 3-5;
   before stretching and before slitting the film, forming strips of increased thickness in the film at locations where free edges are to be formed;
   slitting the strips of increased thickness to create the free edges in the strips of increased thickness;
   stretching the film 50-400 percent, the stretching being between at least two adjacent stretching sections, each stretching section having unheated stretching rolls, each unheated stretching roll being rotated at a different speed that progressively increase in a direction of stretching to achieve the 50-400 percent stretching of the film to create the pre-stretch film;

selecting a diameter of the unheated stretching rolls, the diameter being set to be a predetermined magnitude, setting a spacing between the stretching rolls, the spacing being set to less than 5 mm, the diameter of the stretching rolls and spacing being set to reduce neck-in based film width loss and reduce neck-in based edge thickening, and to cause a width of the stretched film to be less than 10 percent less than the film before stretching;

the reduced neck-in of the film due to the spacing between the unheated stretching rolls and the diameter of the unheated stretching rolls being set to a pre-determined value also resulting in reducing thickening of the free edges; and combining the reduced neck-in based thickening of the free edges and the strips of increased thickness to thicken the free edges 50 to 100 percent more than the thickness of the film between the free edges to produce a wider film with the 50 to 100 percent thicker free edges, compared to another film without the strips of increased thickness.

* * * * *